(12) United States Patent
Barthel et al.

(10) Patent No.: US 8,071,666 B2
(45) Date of Patent: Dec. 6, 2011

(54) STABILIZED FUMED SILICA SUSPENSIONS FOR REINFORCEMENT OF REACTIVE RESINS

(75) Inventors: Herbert Barthel, Emmerting (DE); Michael Dreyer, Burgkirchen (DE); Torsten Gottschalk-Gaudig, Mehring (DE)

(73) Assignee: Wacker Chemie AG, Munich (DE)

( * ) Notice: Subject to any disclaimer, the term of this patent is extended or adjusted under 35 U.S.C. 154(b) by 517 days.

(21) Appl. No.: 11/997,038

(22) PCT Filed: Jul. 4, 2006

(86) PCT No.: PCT/EP2006/063842
§ 371 (c)(1),
(2), (4) Date: Jan. 28, 2008

(87) PCT Pub. No.: WO2007/012547
PCT Pub. Date: Feb. 1, 2007

(65) Prior Publication Data
US 2008/0207842 A1  Aug. 28, 2008

(30) Foreign Application Priority Data
Jul. 28, 2005  (DE) .......................... 10 2005 035 442

(51) Int. Cl.
*C08K 9/06* (2006.01)
*C08L 63/00* (2006.01)

(52) U.S. Cl. ......... 523/209; 523/200; 523/205; 523/466

(58) Field of Classification Search .............. 524/81, 524/437, 430; 525/50; 106/287.34; 252/182.32; 523/200, 205, 209, 466
See application file for complete search history.

(56) References Cited

U.S. PATENT DOCUMENTS

| | | | | |
|---|---|---|---|---|
| 3,131,148 A | * | 4/1964 | Taulli | 508/136 |
| 5,965,299 A | * | 10/1999 | Khan et al. | 429/313 |
| 6,103,004 A | | 8/2000 | Belligoi et al. | |
| 2002/0192476 A1 | * | 12/2002 | Kambe et al. | 428/447 |
| 2003/0050389 A1 | | 3/2003 | Manshausen et al. | |
| 2004/0198887 A1 | * | 10/2004 | Brown et al. | 524/430 |
| 2004/0220419 A1 | * | 11/2004 | Gottschalk-Gaudig et al. | 556/10 |

FOREIGN PATENT DOCUMENTS

| | | |
|---|---|---|
| DE | 19516253 A1 | 10/1996 |
| EP | 0161038 A1 | 11/1985 |
| EP | 0686676 A1 | 12/1995 |
| EP | 0896029 A1 | 2/1999 |
| EP | 1209191 A2 | 5/2002 |
| EP | 1241211 A1 | 9/2002 |
| EP | 1302444 A1 | 4/2003 |
| EP | 1304332 A1 | 4/2003 |
| EP | 1473296 A1 | 11/2004 |
| WO | 9920698 | 4/1999 |
| WO | 0034382 | 6/2000 |

OTHER PUBLICATIONS

Safety Data Sheet for Styrene; Nov. 28, 2000.*
Material Safety Data Sheet for Magnesium; Nov. 2, 2001.*
Kindley, Contrails (1960).*
International Search Report.
Statement of Dr. Markus Ege.

* cited by examiner

*Primary Examiner* — Karuna P Reddy
(74) *Attorney, Agent, or Firm* — Brooks Kushman P.C.

(57) ABSTRACT

Suspensions having good flow properties are produced by including a particulate thickener containing chemically or physically bound polymer.

20 Claims, No Drawings

STABILIZED FUMED SILICA SUSPENSIONS FOR REINFORCEMENT OF REACTIVE RESINS

CROSS-REFERENCE TO RELATED APPLICATION

This application is the U.S. national phase of PCT Appln. No. PCT/EP2006/063842 filed Jul. 4, 2006 which claims priority to German application 10 2005 035 442.4 filed Jul. 28, 2005.

BACKGROUND OF THE INVENTION

1. Field of the Invention

The invention relates to a suspension and to products produced from it.

2. Description of the Related Art

Fumed silica is known for use as thickener and rheological additive. Fumed silica is bulky and exhibits a high degree of interparticulate interaction, and in liquid media produces stable gel states, more particularly at high solids content.

Use as a reinforcing filler in reactive resins and polymer systems, however, necessitates high levels of loading with active fillers which at the same time are particulate thickeners, such as with fumed silica, for example. In many cases, a high thickening action and hence high viscosity and gel state, and hence loss of fluidity, represents a major problem in the processing of active, finely divided, and colloidal fillers. The results are high viscosity, poor fluidity, crepe hardening, lack of pumpability, lack of spreadability, lack of sprayability, inadequate flow in paints, varnishes, and surface coatings, and inadequate processing properties.

It is known that the thickening action of colloidal fillers is associated with OH groups on their surface, and also that oxidic fillers with a high specific surface area are subject to strong Van-der-Waals' interactions, and hence thicken and crepe-harden liquids such as polymers, reactive resins, paints, varnishes, coating materials, adhesives, elastomers, and plastomers, in other words increase their viscosity.

One known way of suppressing the thickening action of metal oxides which at the same time are particulate thickeners is to surface-treat them. In many cases, however, surface treatment may likewise lead to a pronounced rise in the viscosity and in the development of a yield point, as described in EP-A-0686676.

SUMMARY OF THE INVENTION

It is an object of the invention to improve on the prior art and more particularly to provide fluid systems with a simultaneously high fraction of typical "thickeners" that at the same time act as reinforcing fillers. These and other objects are achieved by the invention.

Surprisingly it has now been found that stable suspensions of finely divided and colloidal particles which at the same time are particulate thickeners are obtained by binding polymers stably to the finely divided and colloidal particles, which at the same time are particulate thickeners, in the suspension, this binding including strong physical bonds and chemical bonds, and thus making it possible to use finely divided particles, which are at the same time particulate thickeners, to reinforce reactive resins such as adhesives, coating materials, and printing inks through the use of inventively stabilized suspensions, such as dispersions, of particulate thickener.

Surprisingly it is possible in this way to use particulate thickeners which can be produced inexpensively and are available industrially in large volumes, such as precipitated silica and fumed silica, fumed aluminum oxides and titanium dioxides, as reinforcing fillers with a high degree of filling and hence a high reinforcing effect and at the same time low viscosity, and hence cost-effective handling and good and easy processing of the suspensions of the invention.

The invention first provides a suspension characterized in that it contains at least 3 percent by weight, preferably at least 6 percent by weight, more preferably at least 12 percent by weight, with particular preference at least 15 percent, yet more preferably at least 18 percent by weight, and most preferably at least 24 percent by weight, of particulate thickener, an amount of at least 5 percent by weight, preferably at least 10 percent by weight, more preferably at least 20 percent by weight, with very particular preference at least 33 percent by weight, and with special preference at least 50 percent by weight, of at least of one polymer, based on the pure particulate thickener composition without polymer, being bound to this particulate thickener in the suspension, and in that, if desired, there is at least one further polymer or else two or more polymers present freely in the suspension, such that the relative viscosity $\eta_{rel}=\eta/\eta_0$, where $\eta$ and $\eta_0$ are measured at the same temperature and at a temperature of 25° C., is less than 100, preferably less than 50, more preferably less than 10, yet more preferably less than 5, still more preferably less than 3, and most preferably less than 2, and, in the event of storage for at least one week, preferably for at least 4 weeks, more preferably for at least 3 months, yet more preferably for at least 6 months, and most preferably for at least 12 months, at a temperature of 40° C., the relative viscosity $\eta/\eta_0$ changes by a factor of less than 10, preferably by a factor of less than 5, more preferably by a factor of less than 2.5, yet more preferably by a factor of less than 1.5, and comprises a liquid phase which, based on the total liquid phase, contains 0-80 percent by weight, preferably 0-50 percent by weight, more preferably 0-25 percent by weight, of one or more solvents, it also being possible for the solvent to be a crosslinkable component, having a viscosity of less than 100 mPas, preferably less than 10 mPas, at 25° C. and which, based on the total liquid phase, contains 10-100 percent by weight, preferably 50-100 percent by weight, more preferably 75-100 percent by weight of a polymer component or of a mixture of two or more physically or chemically crosslinkable polymers.

Determining the amount of polymer bound to particulate thickener in the suspension can be done, for example, by filtering the particulate thickener using precision filters, ultrafine filters with and without pressure, for example by means of pressurized suction filters and submicron precision filters. In this case the filtrate is preferably washed a number of times with a suitable solvent, preferably 3 times, more preferably 5 times. A suitable solvent is one that would be a good solvent for the bound polymer in the unbound state. The filter cake is preferably washed until the wash liquid contains less than 1 percent by weight of polymer, based on particulate thickener used in the analytical procedure. Other preferred and suitable methods include centrifugation with a moderate gravitation field, set so that particulate thickener undergoes sedimentation within the analysis time but polymer does not yet undergo sedimentation, and, as described above, repeated washing with solvent. Suitable methods for determining polymer bound to inorganic particulate thickener are elemental analysis for carbon content, nitrogen content, silicon content, nuclear spin resonance methods such as $^1$H-NMR, $^{13}$C-NMR, $^{15}$N-NMR, $^{29}$Si-NMR, and the various versions of infrared analysis, such as FTIR, DRIFT, ATIR.

The relative viscosity $\eta/\eta_0$ is defined as the ratio of the viscosity $\eta$ of the suspension comprising, inventively, particulate thickener to the viscosity $\eta_0$ of liquid phase without particulate thickener, with $\eta$ and $\eta_0$ being measured at the same temperature and at a temperature of 25° C.

The particulate thickeners of the invention are preferably particulate thickeners which are solid at room temperature under the pressure of the surrounding atmosphere, i.e., at between 900 and 1100 hPa.

The particulate thickeners of the invention are preferably insoluble or of low solubility in water or in other solvents which can be used to prepare the suspension of the invention.

The particulate thickeners of the invention preferably have a solubility in water at a pH of 7.33, an electrolyte background of 0.11 mol/l, and a temperature of 37° C., of less than 0.1 g/l, more preferably less than 0.05 g/l, under the pressure of the surrounding atmosphere, i.e., at between 900 and 1100 hPa.

The particulate thickeners used in accordance with the invention preferably have a molar mass of more than 10,000 g/mol, more preferably a molar mass of 50,000 to 100,000,000 g/mol, and most preferably from 100,000 to 10,000,000 g/mol, measured in each case preferably by means of static light scattering.

The particulate thickeners used in accordance with the invention preferably have a carbon content of less than 50 percent by weight, more preferably less than 10 percent by weight, yet more preferably less than 5 percent by weight, still more preferably less than 1 percent by weight, and most preferably less than 0.1 percent by weight.

The particulate thickeners of the invention preferably have a Mohs hardness of greater than or equal to 1. With particular preference the particulate thickeners have a Mohs hardness greater than 4, and with very particular preference greater than 5.

Particulate thickeners, preferably consist of organosilicon resins such as silicone resins, for example methylsilicone resins, containing units of the formula [$(CH_3)SiO_{3/2}$], phenylsilicone resins containing units of the formula [$(C_6H_5)SiO_{3/2}$], or methylphenylsilicone resins containing of units of the formula [$(CH_3)_x(C_6H_5)_ySiO_{3/2}$] with x+y=1, or of organic resins such as epoxy resins, acrylic resins, e.g., polymethyl methacrylates, and also polymers such as polyolefins, e.g., polystyrene, and also metal colloids, e.g., silver colloids, and also metal oxides, examples being oxides of main group III, such as aluminum oxides, oxides of main group IV, such as silicon dioxides, germanium oxides, and of main group V, such as antimony oxides, or such as antimony tin oxides and, for example, oxides of the transition group metals, such as titanium(IV) dioxides, such as zirconium(IV) oxides, such as zinc oxides, such as iron oxides, for example such as iron(II) oxides, iron(III) oxides, such as magnetites, ferrites, and such as oxides of the lanthanides, such as cerium(IV) oxides; and also any desired mixtures of these oxides, such as mixed silicon dioxide-aluminum-oxide oxides of any desired composition, preferably with a silicon dioxide content of 20 to 100 percent by weight, such as mixed silicon dioxide-iron (III) oxide oxides of any desired composition, preferably with a silicon dioxide content of 20 to 100 percent by weight, such as mixed silicon dioxide-titanium(IV) oxides of any desired composition, preferably with a silicon dioxide content of 20 to 100 percent by weight; and also insoluble or sparingly soluble ionic and mineral compounds, such as calcium carbonates, barium sulfates, iron(II) sulfides, such as pyrites, calcium silicates, aluminum silicates, such as aluminum phyllosilicates, clays for example, such as bentonites, montmorillonites, including those which have been organically modified; and hectorites, including those which have been organically modified; and also micronized minerals and finely ground rocks; and also non-ionic compounds of low solubility, such as boron nitrides, silicon nitrides or silicon carbides.

Inventively preferred as particulate thickeners are metal oxides having BET specific surface areas of greater than 10 $m^2/g$, such as metal oxides prepared by precipitation processes, such as metal oxides prepared in high-temperature processes, such as fumed metal oxides prepared in flame processes, such as metal oxides prepared in plasma processes, such as metal oxides prepared in hot-wall reactors, and metal oxides prepared by laser methods.

Preferred particulate thickeners are silicon dioxide particles, silica particles, aluminum oxide particles, titanium dioxide particles, zirconium dioxide particles, metal carbonates, and polymeric particles.

Examples of metal carbonates are preferably precipitated barium carbonates or precipitated calcium carbonates, examples being those modified with carboxylic acids and salts of carboxylic acids, such as sodium or potassium stearates, for example.

Particularly preferred particulate thickeners are silicas having BET specific surface areas of greater than 10 $m^2/g$, more preferably synthetic silicas, such as wet-chemically prepared silicas, such as silica sols and silica gels, for example, and precipitated silicas, such as fumed silicas prepared in flame processes, such as silicon dioxides prepared in plasma processes, such as silicon dioxides prepared in hot-wall reactors, such as silicon dioxides prepared in laser methods, particular preference being given to fumed silica prepared at preferred temperatures of more than 1000° C. Particulate thickeners in the suspension can also be selected from any desired mixtures of the particulate thickeners specified above.

Particulate thickeners in accordance with the invention have an average diameter of less than 100 µm. The particulate thickeners used in accordance with the invention preferably have an average diameter of greater than 1 nm, preferably from 1 nm to 100 µm, more preferably from 10 nm to 10 µm, and most preferably from 10 nm to 1000 nm.

The particulate thickeners preferably have an average primary particle size $d_{pp}$ of 0.5 to 1000 nm, more preferably 5 to 100 nm, with particular preference 5 to 50 nm. Suitable measurement methods for this purpose are, for example, the determination of the BET surface areas and of the material density $d_{pp}=6/(BET*material density)$ or, for example, transmission electron microscopy or high-resolution scanning electron microscopy, in field emission mode, for example, or, for example, ultrasound spectroscopy in the measurement range of 1 to 100 MHz. Further examples of primary particle size measurement techniques are small-angle x-ray scattering (SAXS), small-angle neutron scattering (SANS), and small-angle light scattering (SALS), the primary particle size being obtained as the transition from surface scattering to particle-particle scattering; this can be evaluated as the transition from the Porod regime to the Guinier regime.

Preference is given to using particulate thickeners which have a broad primary particle distribution. The total breadth of distribution of all the primary particles across all the aggregates is preferably greater than 2, more preferably greater than 3, and most preferably greater than 5, based on the average primary particle diameter of all the primary particles. The internal breadth of distribution of the primary particles in one aggregate is preferably less than 5, more preferably less than 3, and most preferably less than 2, with very particular preference given to less than 1.5, the internal breadth of distribution representing the ratio between largest and smallest primary particle diameters in one aggregate.

The particulate thickeners preferably have an average secondary-structure or aggregate particle size, $d_{Aggr}$, of 50 to 5000 nm, more preferably 100 to 500 nm, measured as the hydrodynamic diameter. Suitable measurement methods for this purpose are, for example, dynamic light scattering or photocorrelation spectroscopy or quasielastic light scattering. To measure particulate thickener concentrations of more than 0.01% by weight, this measurement can be corrected against multiple scattering by means of measurement in backscattering, for example at 170° to 175°, or by means of cross-correlation. Further examples of aggregate particle size measurement techniques are small-angle x-ray scattering (SAXS), small-angle neutron scattering (SANS), and small-angle light scattering (SALS).

Preference is given to using particulate thickeners which have a broad aggregate size distribution. The overall breadth of distribution of all the aggregates is preferably greater than 2, more preferably greater than 3, and most preferably greater than 5, based on the average aggregate diameter of all the aggregates. Preferably the ratio of the 97.5% cumulative pass FIGURE to the 2.5% cumulative pass FIGURE of the total breadth of distribution of all the diameters of all the aggregates is greater than 2, more preferably greater than 3, yet more preferably greater than 5, and most preferably greater than 10.

The particulate thickeners preferably have an average tertiary or agglomerate particle size, $d_{Aggl}$, of greater than 100 nm, measured at the geometric diameter. Suitable measurement methods for this purpose are, for example, laser light diffraction or sieving methods.

The particulate thickeners preferably have a specific surface area of 1 to 1000 m$^2$/g, more preferably 10 to 500 m$^2$/g, and most preferably from 25 to 350 m$^2$/g. The BET surface area is measured by known methods, preferably in accordance with German Industry Standard DIN 66131 and DIN 66132.

In one preferred embodiment the BET specific surface area of the particulate thickeners is 10-150 m$^2$/g, more preferably 30-80 m$^2$/g.

Preferably the particulate thickeners have a fractal surface dimension $D_s$ of less than or equal to 2.3, more preferably less than or equal to 2.1, and with particular preference of 1.95 to 2.05, the fractal surface dimension D, being defined here as: particle surface area is proportional to particle radius R to the power of $D_s$.

Preferably the particulate thickeners have a fractal mass dimension, $D_m$, of less than or equal to 2.8, more preferably less than or equal to 2.5, and with particular preference of 1.9 to 2.2. The fractal mass dimension $D_s$ is defined here as: particle mass is proportional to particle radius R to the power of $D_m$.

With preference it is possible to use hydrophilic fumed silicas which have been freshly prepared and come, for example, directly from the flame; those which have been cooled; those which have been deacidified and purified; and those which have been stored or have already been packaged in the commercially customary way. It is also possible to use hydrophobized or silylated silicas, examples being the commercially customary silicas.

Mixtures of different silicas can be used—for example, mixtures of silicas with different BET surface areas, or mixtures of silicas with different degrees of hydrophobization or silylation.

In one preferred embodiment the particulate thickeners are hydrophobic particulate thickeners.

In another preferred embodiment the particulate thickeners are preferably surface-modified metal oxides, the surface-modified metal oxides being preferably silylated metal oxides modified with organosilicon compounds, with very particular preference surface-modified, preferably silylated, fumed silica modified with organosilicon compounds.

Preference is given to particulate thickeners which have been organofunctionally surface-modified. Particularly preferred particulate thickeners are those which have been organofunctionally surface-modified with organosilicon compounds.

Preference is given to using particulate thickeners which have been prepared in accordance with EP-A-896 029, EP-A-1302444, EP-A-1304332, and EP-A-1473296.

In the preparation of the hydrophobic particulate thickeners it is additionally possible, during the silylating or hydrophobizing operation, to employ methods for compaction, such as compaction by withdrawal of the air or gas under suction, by means of suitable vacuum methods, such as compaction by mechanical methods, such as, for example, pressed rollers, ball mills, edge runner mills, worm compactors, and briquetting machines.

In the preparation of the hydrophobic particulate thickeners it is additionally possible, during the silylating or hydrophobizing operation, to employ methods of deagglomeration, such as pinned-disk mills or milling/classifying devices.

It is possible to use uncompacted silicas, with tapped densities of less than 60 g/l, or else compacted silicas, with tapped densities of greater than 60 g/l. The tapped density can be determined in accordance with DIN EN ISO 787-11. Preference is given to particulate thickeners with tapped densities in accordance with DIN EN ISO 787-11 of greater than 60 g/l, more preferably greater than 120 g/l, yet more preferably greater than 250 g/l, and with special preference, greater than 500 g/l.

Preferred particulate thickeners are those which form accumulations with a porosity >0.5, more preferably >0.8, yet more preferably >0.9, and most preferably >0.95. The porosity E of an accumulation is defined as $$\epsilon = 1 - \text{volume}_{material}/\text{volume}_{body}$$

where volume$_{material}$=volume of the particulate thickeners and where volume$_{body}$=total volume of the accumulation. The porosity $\epsilon$ can be determined by means of mercury porosimetry or using inert gases such as helium or argon, by measuring the empty volume, volume$_{empty}$, of the accumulation, where $\epsilon$=volume$_{empty}$/volume$_{body}$.

In one particularly preferred embodiment, particulate thickeners are nanoparticles.

In accordance with the invention the particulate thickeners and particle-bound polymer in the liquid preferably form a colloidal suspension. "Colloidal suspension of particulate thickeners" here means that the transparency of the suspension, measured as transmitted light, in other words not absorbed light, is not less than 50%, preferably less than 25%, more preferably less than 10%, of that of the particle-free liquid or crosslinked composition.

In accordance with the invention the particulate thickeners are preferably distributed colloidally in the suspension. The colloidal distribution of the particulate thickeners in the suspension is indicated by a high transparency for the suspension. Preferably the transparency is greater than 50%, more preferably greater than 75%, and with particular preference greater than 90%, based on the noninventive liquid or suspension comprising particulate thickeners, or on the crosslinked composition produced therefrom.

The suspension or dispersion of the invention is prepared as described below. In accordance with the invention, particulate thickener is incorporated by mixing and dispersing into the monomer, oligomer, polymer or resin, and is thereby dispersed and suspended, preferably under the action of shearing energy, such as mechanical or ultrasonic shearing; for example, dissolvers are used for preliminary dispersing and also for the main dispersing. In the dissolver, the dispersing action is obtained through the difference in speed between disk surface and material for grinding. In the case of normal paint millbases with viscosities of between 10 to 50 Pa·s at 25° C., fine-toothed disks are used; in the case of highly viscous media, up to 100 Pa*s at 25° C., coarse-toothed disks are used. The peripheral speeds are preferably 10-25 mm/s and the dispersing times are preferably in the 15-40 minute range. Manufacturers of dissolvers are, for example, W. Niemann GmbH & Co KG, VMA-Getzmann GmbH or else Netsch GmbH. An alternative to preliminary dispersing and main dispersing together with dust-free powder introduction is formed by machines which develop a suction vacuum in the liquid stream and disperse in accordance with the ROTOR-STATOR principle. The settings of the slot in the stator can be adapted to the specific task. An example of a manufacturer is the company Y-Strahl. The following are used for dispersing, for example: 3 rolls, more particularly for the manufacture of pastelike printing inks; ball mills which are used with steel balls and ceramic balls (20-30 mm in diameter) in defined proportions to the millbase; and stirred ball mills. Description of a stirred ball mill: in a milling vessel filled with sand or grinding beads there is a rotating stirrer shaft with grinding disks. The millbase is pumped through the milling vessel from below, for example, or else from the end face in the case of horizontal mills. Grinding media used are generally sand, hard glass beads, and, preferably, ceramic grinding beads of 0.1 to 3.0 mm.

In accordance with the invention, as a result of the dispersing as described above, oligomer, polymer or resin is bound chemisorptively, preferably "in situ", to particulate thickener—in other words, a chemical reaction is obtained between oligomer, polymer or resin and particulate thickener—or oligomer, polymer or resin is bound physisorptively to particulate thickener.

In accordance with the invention the suspension of the particulate thickeners in the liquid is stable. Stable here means that after a time of greater than 100 h there is less than 10%, preferably less than 5%, more preferably less than 1% sedimentation of the particulate thickeners as a portion of the total mass of particulate thickeners.

In accordance with another measurement method, stable here means that there is no gelling, no firm consistency or else no crepe hardening.

No gelling can be determined by the presence of fluidity, even at rest and without an external shearing force.

No firm consistency, in other words fluidity, means that even with a low shearing stress of the viscous component, the loss modulus G" of the viscoelastic suspension, is greater than the elastic component, the storage modulus G' of the viscoelastic suspension is measured preferably with a shear stress of less than 1 Pa or with a deformation of less than 1%.

No crepe hardening means that the relative viscosity $\eta_{rel}=\eta/\eta_0$ is less than 100, preferably less than 50, more preferably less than 10, very preferably less than 5, with a special preference less than 3, with outstanding preference less than 2, and, on storage for at least one week, preferably at least 4 weeks, more preferably at least 3 months, very preferably at least 6 months, with a special preference at least 12 months, at a temperature of 40° C., the relative viscosity $\eta_{rel}=\eta/\eta_0$ changes by a factor of less than 10, preferably by a factor of less than 5, more preferably by a factor of less than 2.5, and with very particular preference by a factor of less than 1.5.

In accordance with the invention the liquid phase is a fluid material having a viscosity of 0.1 to 100,000 Pas at temperatures of −120° C. to 500° C. at a shear rate of 0.001 s$^{-1}$ to 1,000,000 s$^{-1}$.

In accordance with the invention the liquid phase preferably comprises solvents such as inert and reactive, polar and apolar, protic and aprotic solvents. The solvents may in pure form have a viscosity of less than 100 mPas at 25° C., preferably less than 10 mPas, more preferably less than 2 mPas.

Examples of preferred reactive solvents are reactive diluents such as monostyrene; monoacrylates such as alkyl acrylates, methyl acrylate for example; alkyl alkylacrylates such as methyl methacrylate or hexyl methacrylate; oligoalkyl alkylacrylates; or glycidyl ethers such as allyl glycidyl ether, for example.

Examples of preferred inert and apolar solvents are aliphatic hydrocarbons such as cyclic, linear, and branched saturated hydrocarbons, for example hexanes such as n-hexane or cyclohexane, or decanes such as n-decane, and cyclic, linear, and branched unsaturated hydrocarbons such as hexene, and aromatic hydrocarbons such as benzene, toluene or xylene, and mixtures of hydrocarbons, such as benzine, light benzine, or higher-boiling hydrocarbons.

One example of a protic solvent is water. Further examples of preferred protic solvents are alcohols such as alkyl alcohols, for example methanol, ethanol, propanols such as n-propanol and isopropanol, and butanols.

Examples of preferred polar and nonprotic solvents are ketones such as acetone, methyl ethyl ketone, methyl isobutyl ketone, ethers such as diethyl ether, tetrahydrofuran, and dioxane, and amides such as dimethylformamide.

In accordance with the invention the liquid phase preferably comprises polymers, oligomers, and resins, individually or as any desired mixtures. In accordance with the invention the liquid phase may comprise two or more polymers, two or more oligomers, and two or more resins, individually or as any desired mixtures. A polymer is defined herein as a compound formed from greater than 3 subunits of a monomer.

Polymers, oligomers, and resins preferably have a molecular weight of 100 to 10,000,000 mol/g, more preferably 50,000 mol/g, and most preferably 500-5000 mol/g. Polymers, oligomers, and resins are preferably linear, cyclic, or branched, and may be mixtures of polymers.

Examples of preferred polymers are organosilicon compounds such as organo(poly)silanes, organo(poly)siloxanes such as dialkylpolysiloxanes, polydimethylsiloxanes for example, and their copolymers, such as polydimethylsiloxane-polyurethane copolymers, available as reaction products of α,ω-amino-terminary polydimethylsiloxanes and alkyl isocyanates (available from Wacker-Chemie GmbH under the name Geniomer®), such as organo(poly)silazanes and organo(poly)silcarbanes; polyolefins, such as polyethylenes and polypropylenes, substituted polyolefins for example, such as silyl-terminated polyisobutylenes; polyurethanes, polyols, such as hydroxy-containing polyesters, hydroxy-containing polyethers, methyldimethoxysilylpropyl-terminated polypropylene glycols (e.g., obtainable as "MS Polymers" from Kaneka Corp. Japan), hydroxy-containing polyacrylates; polyisocyanates such as aliphatic and aromatic polyisocyanates, isocyanate-terminated polyurethane prepolymers, prepared by reacting polyols with polyisocyanates in excess, and also their silyl-terminated derivatives (e.g., available under the name DESMOSEAL® from Bayer AG, Germany); (poly)epoxy compounds, such as bisphenol A and bisphenol F based epoxides, monomeric, oligomeric, and polymeric compounds comprising glycidyloxy functions, such as diglycidyl ethers based on bisphenol A and bisphenol F, epoxy-novolak base materials and resins, epoxy-alkyd resins, epoxy acrylates, aliphatic epoxides such as linear alkylenebisglycidyl ethers and cycloaliphatic glycidyl ethers such as 3,4-epoxycyclohexyl 3,4-epoxycyclohexanecarboxylate, and aromatic epoxides such as triglycidyl ethers of p-aminophenol and tetraglycidyl ethers of methylenedianiline; (poly)amines such as cyclic and linear amines, for example hexamethylenediamine, aromatic amines such as 4,4'-methylenebis(2,6-diethylaniline), bis(2-aminoalkyl)polyalkylene oxide, and bis(2-aminopropyl)polypropylene glycol, and Jeffamines® (amino-functional polypropylene oxides), (poly)amidoamines, (poly)mercaptans, (poly)carboxylic acids, (poly)carboxylic anhydrides; acrylates and their esters such as glycidyl acrylates, alkyl acrylates and their esters, and methacrylates and their esters, polysulfide-forming polymers and polysulfides such as thioplasts (e.g., available under the brand name Thiokol from Toray Thiokol Co. Ltd.).

Further examples of preferred polymers are film-forming polymers. Preferred examples of film-forming polymers are physically drying paint binders, such as polyvinyl chloride and its copolymers, polyacrylates and their copolymers, polyvinyl acetates and polyvinyl butyrals and their copolymers, bitumen, hydrocarbon resins; chloro rubbers, cyclo rubber, polyurethanes, epoxy resins, and epoxy resin-polyesters.

Preferred in accordance with the invention are reactive polymers, reactive oligomers, and reactive resins. Preferred examples are reactive polymers, prepolymers, reactive precursors, polymers which can be used as binders, for paints and varnishes, adhesives and sealants, for example, or for elastomers and plastic polymers, and which are able to interact, react or crosslink with themselves or with the particulate thickeners.

Preferred reactive polymers are resin and curing-agent systems, of the kind used for preparing resins and elastomers such as epoxy resins and epoxy elastomers, polyurethane resins and polyurethane elastomers, silicone resins and silicone elastomers, acrylates, polyolefins, polycarbonates, polysulfones, polysulfides, and polyamides.

Preference is given in accordance with the invention to reactive polymers, oligomers, and resins for preparing crosslinking systems in the field of coating materials, adhesives and sealants.

Examples of preferred polymers and reactive polymers are organic polymers such as addition polymers, for example poly(meth)acrylates, polyvinyl esters, polyvinyl alcohols, polyvinyl acetals, polyvinyl chloride, polyfluorinated polyethylenes, with monomeric starting components such as methyl methacrylate, butyl acrylate, ethylhexyl acrylate, hydroxyethyl acrylate, hydroxyethyl methacrylate, hydroxypropyl methacrylate, acrylic acid, and styrene.

Further examples of preferred polymers and reactive polymers are organic polymers such as polycondensation resins, oil-free saturated polyesters and oil-modified polyester resins, fatty oils, short-oil, medium-oil, long-oil alkyd resins, stand oils, and combinations thereof, and also modified alkyd resins such as styrene-modified alkyd resins, acrylic ester-modified alkyd resins, silicone-modified alkyd resins, urethane-modified alkyd resins, and epoxy resin-modified alkyd resins, oxidatively drying paint binders such as short-oil, medium-oil, and long-oil alkyd resins, stand oils, and combinations thereof, and polyesters.

Examples of polymers and reactive polymers are preferably organic polymers such as chemically or reactively drying paint binders, such as polyurethanes, such as 1-component and 2-component polyurethanes, such as epoxy resin systems, such as 2-component epoxy resin systems, such as epoxides which are crosslinked with amines and those which are crosslinked with isocyanates.

Examples of polymers and reactive polymers are preferably silicon-containing polymers, such as polysiloxanes, such as polyorganosiloxanes, such as linear or cyclic dialkylsiloxanes having an average number of dialkylsiloxy units of greater than 3. The dialkylsiloxanes are preferably dimethylsiloxanes. Preference is given to linear polydimethylsiloxanes having the following end groups: trimethylsiloxy, dimethylhydroxysiloxy, dimethylchlorosiloxy, methyldichlorosiloxy, dimethylmethoxysiloxy, methyldimethoxysiloxy, dimethylethoxysiloxy, methyldiethoxysiloxy, dimethylacetoxysiloxy, methyldiacetoxysiloxy and dimethylhydroxysiloxy groups, more particularly with trimethylsiloxy or dimethylhydroxysiloxy end groups.

The stated polydimethylsiloxanes preferably have a viscosity at 25° C. of 20 to 10,000,000 mPas, more preferably from 100,000 mPas to 10,000,000 mPas, with very particular preference from 1,000,000 to 10,000,000 mPas.

Further examples of preferred organosiloxanes are silicone resins, especially those containing methyl groups ($CH_3$) as an alkyl group R, and with particular preference those which contain $R_3SiO_{1/2}$ and $SiO_{4/2}$ units, or those which contain $RSiO_{3/2}$ and optionally $R_2SiO_{2/2}$ units, with R being hydrogen or a saturated or unsaturated, unsubstituted or substituted hydrocarbon radical having 1 to 12 carbon atoms.

The organosiloxanes may in each case be a single kind or else a mixture with at least two kinds of such compounds.

Further examples of preferred polymers are silicone oils such as organofunctional silicone oils, with particular preference aminoalkyl-functional polysiloxanes, polymethylsiloxanes, and polydimethylsiloxanes, silicone resins, with more preferably organofunctional silicone resins, and with particular preference aminoalkyl-functional silicone resins.

Preferred examples are silicone copolymers, and hybrid systems which include organopolysiloxanes and polymers free from silicon atoms. Preferred examples according to the invention are thermoplastic silicone elastomers prepared by α,ω-end termination with 3-aminoalkyldialkylsiloxy radicals, such as 3-aminopropyldimethylsiloxy radicals, and with a degree of end termination of greater than 90%, preferably greater than 95%, more preferably greater than 99%, based on the initial OH end groups of a linear alpha,omega-terminal OH-polydimethylsiloxane, and subsequent reaction of the terminal α,ω-terminal aminoalkylsiloxanes with alkyl diisocyanates. The thermoplastic silicone elastomers preferably have a siloxane fraction of greater than 80 percent by weight, preferably greater than 90 percent by weight, and are preferably solid at 25° C. and have a viscosity of 10,000 to 100,000 Pas at a temperature of 110° C.

Further examples of preferred polydimethylsiloxanes are polymers for the preparation of silicone rubbers, such as polymers for preparing 1-component or 2-component silicone elastomers which in the absence of moisture are storage-stable but which on exposure to water or moisture undergo vulcanization and curing, or for preparing 1-component or 2-component silicone elastomers which are crosslinkable peroxidically, at elevated temperature for example, such as 80 to 200° C., by means, for example, of linking of saturated and/or unsaturated alkyl groups, or are crosslinkable by addition reaction of olefinic C═C double bonds and silicon-hydrogen groups Si—H, preferably under the action of a catalyst, such as platinum, palladium or ruthenium, at room temperature or temperatures from 10 to 150° C.

Examples of siloxane containing condensable groups include organopolysiloxane preferably containing units of the formulae $SiO_{4/2}$, $R_3SiO_{1/2}$, $R_2SiO_{2/2}$ and $RSiO_{3/2}$, where R is hydrogen or saturated or unsaturated, unsubstituted or substituted hydrocarbon radical having from 1 to 12 carbon atoms.

Examples of silicone resins are preferably those composed of $RSiO_{3/2}$, $R_3SiO_{1/2}$, and $SiO_{4/2}$ units, R being hydrogen or saturated or unsaturated, unsubstituted or substituted hydrocarbon radical having 1 to 12 carbon atoms, in any desired mixture, preferably with molecular weights of 100 to 20,000 grams per mole, and with a viscosity of 50 to 50,000 mPas at a temperature of 25° C., or, if the silicone resins are solids, at a viscosity of the 0.1% to 50% strength by weight solution of the silicone resins in an inert solvent such as toluene, tetrahydrofuran, methyl ethyl ketone or isopropanol of 50 to 50,000 mPas at a temperature of 25° C. Preferred examples are methylsilicone resins and phenylsilicone resins, and methylphenylsilicone resins. Preference is given to silicone resins having primary, secondary, and tertiary aminoalkyl functions and having an amine number of 0.5 to 10 and a molecular weight of 250-20,000 mol/g.

Further inventively preferred examples of reactive polymers are preferably silane-terminated, silane-functional, and organosilane-modified polymers such as polymers which contain mono-, di-, and tri-alkoxysilane radicals, terminally or bonded in the chain. Examples thereof are silane-terminated polymers prepared via the reaction of aminoalkylalkoxysilane and mono-, di- and/or polyisocyanates, or prepared by copolymerization of methacryloyloxyalkylsilanes and acrylates or alkyl acrylates, including alkoxysilane-functional polyols prepared by copolymerization with other olefins such as styrenes, monostyrene, or those prepared by reaction of alkoxysilanes with polyols such as polyacrylate-polyols, polyester polyols or polyether polyols, of the kind used for preparing polyurethanes. The silane termination of polyacrylate-polyols can be effected by copolymerization with methacryloyloxy-functional alkoxysilanes such as 3-methacryloyloxypropyltrimethoxysilane, or, preferably, with 1-methacryloyloxymethyltrimethoxysilane. The silane termination of polyisocyanates can be effected by reaction with amino-functional alkoxysilanes, such as 3-aminopropyltrimethoxysilane, or, preferably, with 1-piperazinomethyltrimethoxysilane.

Further inventively preferred examples of reactive polymers are preferably epoxy-functional or glycidyloxy-functional monomers, oligomers or polymers such as epoxy resins, diglycidyl ethers of bisphenol A, cycloaliphatic epoxides, of the kind used, for example, for producing epoxy adhesives, epoxy composites, glass fiber-reinforced epoxy polymers, and epoxy surface coatings.

Examples of preferred epoxides are epoxy resins such as liquid, semisolid, and solid epoxy resins, epoxy resins consisting, for example, of binders, bisphenol A and/or bisphenol F, and also phenol novolak glycidyl ethers, cresol novolak glycidyl ethers, cycloaliphatic glycidyl compounds, and epoxidized cycloolefins, and curing agents based on aliphatic amines, such as polyfunctional amines based on polyether-polyamines, alkylenediamines, such as propylenediamines, or cycloaliphatic amines, polyaminoamides, Mannich bases, epoxide adducts, mercaptans, and acid anhydrides.

Further examples of epoxy compounds are preferably cycloaliphatic epoxides, and alkylenebisglycidyl ethers, such as

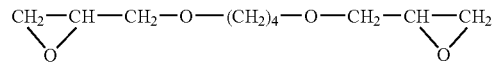

bisphenol A based diglycidyl ethers, such as

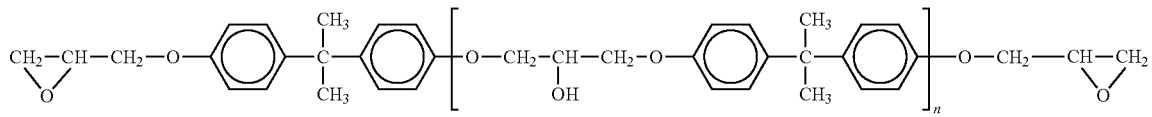

n being preferably from 0 to 10, more preferably 0 to 5.

Examples of epoxy-novolak resins, such as those of the formula

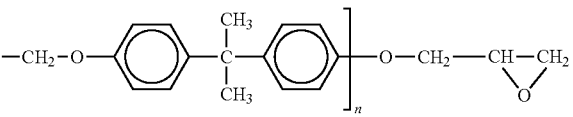

bifunctional epoxy compounds, such as, for example, cycloaliphatic epoxy compounds,

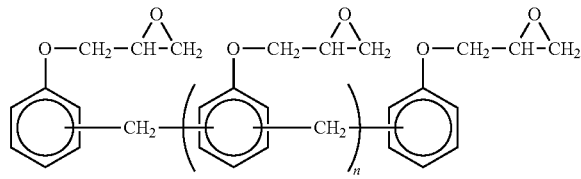

trifunctional epoxy compounds, such as

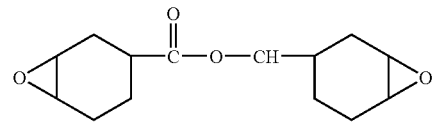

tetrafunctional epoxy compounds, such as

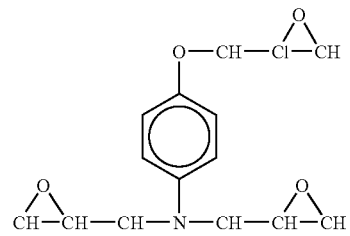
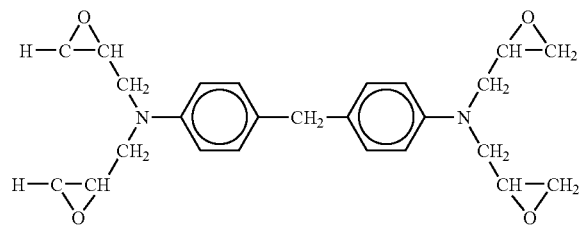

Further inventively preferred examples of reactive polymers are preferably amino-functional polymers, oligomers or monomers, such as polyalkylene oxides which are amino-functional, such as Jeffamines, of the kind used, for example, for preparing elastic and semielastic epoxy adhesives, epoxy composites, glass fiber-reinforced epoxy polymers, and epoxy surface coatings, as curing agents.

Another preferred example of reactive polymers are preferably amino-group-containing monomers, oligomers, polymers, and resins, such as, for example, curing agents for epoxy systems or curing agents for polyurethane systems, or curing agents for moisture-crosslinking 1-component silicone adhesives and sealants, or leveling and flow assistants, used, for example, as additives in coating systems, or mixtures thereof.

Another preferred example of polymers are unsaturated polyester resins which are formed from di-, tri- and mono- or polyfunctional carboxylic acids and their anhydrides, such as phthalic anhydride, isophthalic acid, terephthalic acid, hexahydrophthalic anhydride, tetrahydroxophthalic anhydride, hexahydroxoterephthalic acid, adipic acid, maleic acid, fumaric acid, azelaic acid, sebacic acid, decanedicarboxylic acid, dimerized fatty acids, trimellitic anhydride, pyromellitic anhydride, 1,4-cyclohexanedicarboxylic acid, dimethylolpropionic acid, and mono- or polyfunctional alcohols, such as polyols, such as ethylene glycol, 1,2-propanediol, 1,5-pentanediol, diethylene glycol, 1,4-butanediol, 1,6-hexanediol, neopentyl glycol, trimethylpentanediol, 1,4-cyclohexanedimethanol, tricyclodecanedimethanol, trimethylolpropane, glycerol, pentaerythitol, hydrogenated bisphenol A, bisphenol A bishydroxyethyl ether, and their modifications with monomers of the type of acrylic monomers, alkoxysiloxanes and alkoxypolysiloxanes.

Examples are amino-formaldehyde resins, such as urea-formaldehyde resins, melamine-formaldehyde resins, and benzoguanamine resins, prepared from amino compounds such as aromatic amines, carboxamides, cyanamides, guanamines, guandiamines, ureas, sulfonamides, sulfurylamides, thioureas, triazines (melamine resins), urethanes, and carbonyl compounds such as acetaldehyde, acetone, butyraldehyde, formaldehyde, glyoxal, propionaldehyde, and trichloroacetalaldehyde.

Another inventively preferred example of polymers and reactive polymers are preferably polyaddition resins such as polyurethanes, for example, 2-component polyurethanes, 1-component polyurethanes, 1-component moisture-curing polyurethanes, obtained from prepolymers such as polyisocyanates, prepared from base products such as aromatic diisocyanates, for example toluene diisocyanate, methanediphenyl diisocyanate, xylene diisocyanate, aliphatic diisocyanates such as hexamethylenediisocyanate, or hexyl diisocyanate, cycloaliphatic diisocyanates, and the isomer mixtures of each of the listed diisocyanates, blocked or protected polyisocyanates, based on typical blocking agents such as malonic esters and acetoacetic esters, secondary amines, butanone oximes, phenols, caprolactams, and alcohols.

In one inventive embodiment the suspension preferably comprises at least one polymer bound physisorptively to one or more particulate thickeners.

On the surface of the particulate thickeners the polymers may be bound physisorptively, preferably by way of Van der Waals' forces, such as London fluctuating dipoles or dispersion energy, Debye dipoles, Keesom induced dipoles, hydrogen bonds, more particularly between —OH, —NH, —SH, —CO, —F, —Cl groups on the one hand and —OH, —NH, —SH groups on the other hand, and also coordinative, ionic and ionogenic, Lewis acid-base bonds, Brønsted acid-base bonds, and interactions between electrophilic and nucleophilic groups.

With particular preference, polymers bound to particulate thickener preferably contain carboxyl groups, which may be present in terminally and/or pendently bound form in the polymer; preferred examples are polyesters, which preferably contain carboxyl groups of this kind in conjugated disposition adjacent to unsaturated olefinic groups; further preferred examples are polymers containing oxygen ether atoms which exhibit nucleophilicity or weak basicity.

In one preferred inventive embodiment the suspension polymers preferably attached to the particulate thickener contain basic oxygen atoms. Examples of such polymers are polyalkylene oxides, polyols, and polyesters. Preferred examples are polyesters such as those, for example, which can be crosslinked with melamine. Further preferred examples of polymers are polyols such as polyester polyols, polyacrylate polyols, and polyalkylene oxide polyols, of the kind used, for example, for preparing 1- and 2-component polyurethanes.

Particularly preferred examples of polymers attached physisorptively to particulate thickener are paint additives and flow control agents, such as polyalkylene oxide-modified polydialkylsiloxanes, with particular preference polydimethylsiloxanes. Preferred examples are α,ω-terminal or catenary, or linear or branched, or copolymers, or block polymers or block copolymers, polyethylene oxide- and polypropylene oxide-modified polydimethylsiloxanes attached via propylene groups, one C atom of the propylene group being attached to Si atom of the siloxane, and another C atom of the propylene group being attached to an O atom of the polyalkylene oxide. The polyalkylene oxide-modified polydialkylsiloxanes preferably have a viscosity at 25° C. of 100 to 100,000 mPas, with particular preference from 500 to 5000 mPas, and are used in amounts, based on the particulate thickener, of preferably 0.1 to 10 percent by weight, with particular preference from 0.5 to 2.5 percent by weight.

The suspension preferably contains greater than 3 percent by weight, more preferably greater than 12 percent by weight, yet more preferably greater than 15 percent by weight, and with particular preference greater than 18 percent by weight of particulate thickener, preferably fumed silica having a BET specific surface area of greater than 150 m$^2$/g. If the particulate thickener is a fumed silica having a BET specific surface area of less than 150 m$^2$/g, then the suspension contains greater than 20 percent by weight, preferably greater than 30 percent by weight, and more preferably greater than 40 percent by weight, of a fumed silica. The relative viscosity $\eta_{rel}$ in this case is less than 100, preferably less than 50, more preferably less than 10, yet more preferably less than 5, with special preference less than 3, and most preferably less than 2.

In a further inventive embodiment the suspension preferably comprises at least one polymer which is bound chemisorptively to one or more particulate thickeners.

The suspension preferably comprises at least one polymer which is bound chemisorptively to said particulate thickener, this particulate thickener being equipped, through partial or complete surface modification, with surface groups that react chemically with the polymer.

The suspension preferably comprises at least one polymer which is bound chemisorptively to said particulate thickener, this particulate thickener being equipped, through partial or complete silylation, with organofunctional siloxy groups, prepared for example in accordance with EP-A-896 029, EP-A-1302444, EP-A-1304332, and EP-A-1473296, and that react chemically with the polymer.

On the surface of the particulate thickeners the polymers may be bound chemisorptively via at least one bond per polymer molecule, preferably via two or more bonds per polymer molecule.

In another inventive embodiment the suspension comprises different polymers which is (are) bound preferably to one or more particulate thickeners chemisorptively and physisorptively, or else as a mixture of these types of bonding.

Polymer attached to particulate thickener can be prepared by surface-modifying particulate thickener with polymer.

In accordance with the invention the polymer bound to the particulate thickener is preferably prepared by "in situ" surface modifications of a particulate thickener with a polymer.

"In situ" surface modification of particulate thickener with polymer means that particulate thickener is dispersed in polymer, or in polymer mixture or in polymer/solvent mixture, and, during the dispersion or after the dispersion, the polymer becomes bound, chemically or physically, to the particulate thickener. The distinction between chemically and physically arises in this context out of the binding energy of a single molecular binding site; below 70 kcal per mole, binding is physical, while above 70 kcal per mole it is chemical.

In accordance with the invention the polymer is preferably bound in the suspension to particulate thickener by inventive dispersing with high shearing energy, as described above for the preparation of the inventive suspension of optionally reactive particulate thickeners, which may, for example, contain reactive organofunctional siloxy or alkylsiloxy groups, prepared for example in accordance with EP-A-896 029, EP-A-1302444, EP-A-1304332, and EP-A-1473296, in optionally reactive polymers, as described, for example, above under reactive polymers.

In accordance with the invention there are preferably more than 10 parts of polymer attached to 100 parts of particulate thickener, more preferably greater than 20 parts, more preferably greater than 50 parts, and with very particular preference, greater than 100 parts of polymer.

In accordance with the invention the suspension preferably comprises at least one polymer bound chemisorptively to these particulate thickeners, this particulate thickener preferably containing epoxy groups, amino groups, mercapto groups, acrylate groups, isocyanate groups, protected isocyanate groups, carboxylic anhydride groups or carbino groups which react chemically with the polymer. In this context it is possible for each of the respective chemical groups to be present alone or in any desired mixtures with one another.

A further preferred example of suspension according to the invention is preferably epoxy-group-functionalized particulate thickener, more preferably silica, with particular preference fumed silica, which is suspended in amino-group-containing monomers, oligomers, polymers, and resins, such as, for example, curing agents for epoxide systems, or curing agents for polyurethane systems, or curing agents for moisture-crosslinking 1-component silicone adhesives and sealants, or leveling and flow assistants in coating systems, as additives, for example, or mixtures thereof, as described above, and in the course of which, in accordance with the invention, there is a chemical reaction, preferably "in situ", of the primary (—$NH_2$) or secondary (—NH) amino group of the polymer with the surface-bound epoxy groups of the particulate thickener.

Preferably the particulate thickener, more preferably fumed silica, contains 0.1 to 50, yet more preferably 1-20, and most preferably 5 to 15 percent by weight of the surface-bonded epoxy groups, preferably glycidylalkylsiloxy groups or glycidyloxylalkylsiloxy groups.

The particulate thickener preferably comprises epoxy groups surface-functionalized metal oxide or silica, preferably fumed silica, prepared for example in accordance with EP-A-896 029, EP-A-1302444, EP-A-1304332, and EP-A-1473296.

The suspension of the invention preferably comprises particulate thickeners such as metal oxides, more preferably silica, and with particular preference fumed silica, which are surface-functionalized fully or partially with epoxy groups; in other words where only 10-90%, preferably 25-75%, of the surface silanol groups have been reacted with epoxy silane in the latter case.

The suspension of the invention preferably contains at least 3 percent by weight, preferably 3 to 50, more preferably 3 to 25, and with particular preference 10 to 20 percent by weight of particulate thickener, preferably fumed silica. The dispersing of the particulate thickeners, preferably fumed silica, can take place in the presence of a solvent, in a ratio of 0.1 to 10 relative to the system comprising polymer and particulate thickener; the dispersing can also take place without solvents, for sealant and adhesive systems preferably without solvents, and for coating systems preferably with solvent.

The suspension of the invention preferably contains, based on amino-group-containing polymers, greater than 5, more preferably greater than 10, yet more preferably greater than 15, and with very particular preference greater than 18 percent by weight of particulate thickener, preferably metal oxide, with particular preference silica, with very particular preference fumed silica, which is epoxy-group-surface-functionalized and has a BET specific surface area of greater than 150 $m^2/g$.

The suspension of the invention preferably contains, based on amino-group-containing polymers, greater than 10, more preferably greater than 15, yet more preferably greater than 25, and with very particular preference greater than 35 percent by weight of a particulate thickener, preferably metal oxide, with particular preference silica, with very particular preference fumed silica, which is epoxy-group-surface-functionalized and has a BET specific surface area of greater than 150 $m^2/g$.

The relative viscosity $\eta_{rel}=\eta/\eta_0$ of the suspension of the invention is in this case preferably less than 100, more preferably less than 50, yet more preferably less than 10, still more preferably less than 5, with special preference less than 3, and with outstanding preference, less than 2.

The particulate thickeners which can be isolated from the suspension of the invention, preferably fumed silica, preferably have a carbon content of greater than 2, more preferably of 3 to 50, and with particular preference, of 5 to 50 percent by weight.

The particulate thickeners which can be isolated from the suspension of the invention, preferably fumed silica, in this case have an extractables content—an amount of components extractable preferably by means of tetrahydrofuran—of greater than 5, preferably 5 to 100, and with particular preference from 10 to 50 percent by weight.

With particular preference in accordance with the invention the suspension comprises at least one polymer that contains epoxy groups and the particulate thickener preferably contains amino groups, mercapto groups, carboxylic anhydride groups, and carbinol groups, it being possible for the respective group to be present alone or in any desired mixtures with one another, which chemisorptively bind the polymer.

With particular preference in accordance with the invention the suspensions comprise particulate thickener which is functionalized preferably with amino groups, more preferably aminoalkyl groups, and onto this particulate thickener, partially or completely, preferably in "in situ" operations, epoxy-functional or glycidyloxy-functional monomers, oligomers or polymers, such as epoxy resins, are reacted. In accordance with the invention this may take place, for example, by mixing amino-group-functionalized silica, preferably amino-group-functionalized fumed silica, into an epoxy-functional monomer, oligomer, polymer or resin, and carrying out dispersion as described above with reference to the preparation of the suspension of the invention, preferably under the action of high shearing energy, as described above, or with a combination of one or more of the above-described methods, and thereby dispersing and suspending the silica, and in this case, in accordance with the invention, preferably "in situ", a chemical reaction of the epoxy groups of the as-above-described epoxy monomer, epoxy oligomer, epoxy polymer or epoxy resin takes place with the amino groups of the particulate thickener, preferably fumed silica; in other words, for example, one of the typical epoxy-amine crosslinking reactions.

Preferably the particulate thickeners, preferably fumed silica, contain in this case 1 to 50 percent by weight, more preferably 1-20 percent by weight, and most preferably 5 to 15 percent by weight of surface-bound amino groups such as aminoalkylsiloxy groups, primary, $—NH_2$, and secondary, $—NH$, amino groups. Particular preference in this context is given to particulate thickeners, preferably metal oxides, with particular preference fumed silica, which have been partially surface-functionalized with amino groups; in other words only 10-90%, preferably 25-75%, of the surface, preferably of the surface silanol groups, have been reacted with aminosilane. The suspension contains greater than 3 percent by weight, preferably 3 to 50, more preferably 3 to 25 percent by weight, and most preferably 10 to 20 percent by weight, of particulate thickeners, preferably fumed silica. The dispersing of the particulate thickeners, preferably fumed silica, can take place in the presence of a solvent, in a ratio of 0.1 to 10 relative to the mass of polymers and particulate thickeners; the dispersing may also take place without solvents, for sealant and adhesive systems preferably without solvents, and for coating systems preferably with solvent.

Preference is given to a suspension of the invention which comprises at least one polymer that contains carbinol or isocyanate groups and that contains particulate thickeners, that has silanol groups and siloxane groups, it being possible for the respective groups to be present alone or in any desired mixtures with one another, which physisorptively bind the polymer.

With preference in accordance with the invention suspensions comprise particulate thickener that contains silanol groups and siloxane groups and to which monomers, oligomers or polymers, polyols, for example acrylate polyols, polyester polyols, and polyether polyols, can be physisorptively bound. This may take place in accordance with the invention, for example, by mixing and dispersing particulate thickener containing silanol groups and siloxane groups, such as fumed silica, into one or more polyols, preferably under the action of high shearing energy, as described above, or of a combination of one or more of the above-described methods, and thereby dispersing and suspending it. The suspension contains greater than 3 percent by weight, preferably 3 to 50, more preferably 3 to 25 percent by weight, and with particular preference 10 to 20 percent by weight of particulate thickener, preferably fumed silica.

The dispersing of the particulate thickeners, preferably fumed silica, may take place in the presence of a solvent, in a ratio of 0.1 to 10 relative to the mass of polymers and particulate thickeners; the dispersing may also take place without solvents, for sealant and adhesive systems preferably without solvents, for coating systems preferably with solvent.

With preference in accordance with the invention the suspension comprises at least one polymer that contains isocyanate groups and where the particulate thickener contains silanol, siloxane, amino, and carbinol groups, it being possible for the respective group to be present alone or in any desired mixtures with one another, which bind chemisorptively to the polymer.

With particular preference in accordance with the invention suspensions comprise particulate thickener which is functionalized with amino groups, preferably aminoalkyl groups, and onto this particulate thickener, partially or completely, preferably in "in situ" operations, isocyanate-functional or protected isocyanate-functional monomers, oligomers or polymers, such as isocyanate-functional polymers which are used to prepare 1- and 2-component polyurethanes, are reacted. In accordance with the invention this may take place, for example, by mixing and dispersing silica functionalized with amino groups, preferably fumed silica functionalized with aminoalkyl groups, into an isocyanate-functional monomer, oligomer, polymer or resin, preferably under the action of high shearing energy, as described above, or of a combination of one or more of the above-described methods, and thereby dispersing and suspending it, and in accordance with the invention, preferably "vin situ", a chemical reaction of the isocyanate groups of the as-above-described isocyanate monomer, isocyanate oligomer, isocyanate polymer or isocyanate resin takes place with the amino groups of the particulate thickener, preferably fumed silica prepared in accordance with EP-A-1304332, in other words, for example, a typical isocyanate-amine or urethane crosslinking reaction.

Preferably the particulate thickeners, preferably fumed silica, contain in this case 1 to 50 percent by weight, more preferably 1-20 percent by weight, and most preferably 5 to 15 percent by weight of surface-bound amino groups such as aminoalkylsiloxy groups, primary, $—NH_2$, and secondary, $—NH$, amino groups. Particular preference in this context is given to particulate thickeners, preferably metal oxides, with particular preference fumed silica, which have been partially surface-functionalized with amino groups; in other words only 10-90%, preferably 25-75%, of the surfaces, preferably surface silanol groups, have been reacted with aminosilane. Preferably the suspension contains from 3 to 50 percent by weight, more preferably 3 to 25 percent by weight, and most preferably 10 to 20 percent by weight of particulate thickeners, preferably fumed silica. The dispersing of the particulate thickeners, preferably fumed silica, can take place in the presence of a solvent, in a ratio of 0.1 to 10 relative to the mass of polymers and particulate thickeners; the dispersing may also take place without solvents, for sealant and adhesive systems preferably without solvents, and for coating systems preferably with solvent.

Preferably in accordance with the invention the suspension comprises at least one polymer that contains preferably amino groups and particulate thickener, that has silanol groups, carbinol groups, and carboxylic acid groups, it being possible for the respective group to be present alone or in any desired mixtures with one another, which physisorptively bind the polymer.

With preference in accordance with the invention is a suspension which contains particulate thickener that preferably carries acidic groups such as acidic metal, semimetal, and nonmetal hydroxide groups such as $—OH$ groups, $B—OH$, $P—OH$, $Al—OH$, $Si—OH$, $Ge—OH$, and $Zr—OH$ groups, with particular preference silanol groups ($Si—OH$) of the silica surface, with especial preference silanol groups of the fumed silica surface and comprises polymers that are attached to the surface of particulate thickener and have basic groups, such as amines, for example primary, secondary, and tertiary amines, such as polymers which carry amino groups such as primary, secondary or tertiary amines, alkylene-di-, tri- and polyamines, such as polyalkylene oxides containing amino groups, for example Jeffamines, or aliphatic or arylaliphatic polyamines and polyamidoamines, aminosiloxanes such as linear and branched aminosiloxanes, liquid and solid aminosiloxanes such as aminosiloxane polymers or aminosiloxane resins, polydimethylsiloxanes, for example having terminal alkylamino groups or alkylamino groups in the chain that are attached to an Si atom, for example 2-aminoethyl-3-aminopropyl groups, 3-aminopropyl or 1-aminomethyl groups, having a viscosity at 25° C. of 500-5000 mPas and an amine number of 0.5 to 10.

Particularly preferred in accordance with the invention are primary, secondary, and tertiary amino alcohols and their esters with mono-, di-, and poly-carboxylic acids. Preferred examples of amino alcohols are cyclic amino alcohols such as piperidine alcohols, for example 4-piperidine alcohols. Preferred examples of carboxylic acids are dicarboxylic acids with 2 to 24 carbon atoms, with particular preference 4 to 12 carbon atoms. Very particular preference is given to piperidinyl sebacates, such as, for example, piperidinyl-esterified α,ω-dicarboxylic acids, with particular preference bis-1,2,2,6,6-pentamethyl-4-piperidinyl sebacate or methyl-1,2,2,6,6-pentamethyl-4-piperidinyl sebacate, and their mixtures, which find use as liquid universal light stabilizers (HALS: hindered-amine light stabilizer).

With preference in accordance with the invention is a suspension which contains particulate thickeners, with particular preference fumed silica, preferably those with SiOH groups, and comprises basic-group-containing polymer attached to particulate thickeners such as aminopolysiloxane, polydimethylsiloxanes with terminal alkylamino groups or alkylamino groups attached to an Si atom in the chain, such as 2-aminoethyl-3-aminopropyl groups, 3-aminopropyl or 1-aminomethyl groups, having a viscosity at 25° C. of 500-5000 mPas and an amine number of 0.5 to 10.

With preference in accordance with the invention the suspension comprises at least one polymer that contains carboxylic acid groups and particulate thickener that has amino groups, it being possible for the respective group to be present alone or in any desired mixtures with one another, which physisorptively bind the polymer.

With preference in accordance with the invention the suspension comprises particulate thickeners which contain basic groups, and polymers that are attached to particulate thickeners and contain acidic groups.

One inventively particularly preferred example of basic-group-containing particulate thickeners are in this context preferably metal oxides, more preferably silicas, with particular preference fumed silica, which have been partially surface-functionalized with aminoalkyl siloxy groups, in other words those in which 10 to 90%, preferably 25-75% of the entire surface has been silylated, preferably those in which 10% to 90%, preferably 25-75%, of the surface-silanol groups of the untreated silica have been substituted by aminoalkylsiloxy groups.

Preferred examples are particulate thickeners, such as preferably metal oxides, such as silicas, more preferably fumed silicas, which are aminoalkyl-group-functionalized, prepared as described in accordance with EP-A-896 029, EP-A-1302444, EP-A-1304332, and EP-A-1473296.

Inventively preferred examples of acid-group-containing polymers are polymers which contain acidic carboxyl groups (—COOH) terminally and pendently or only pendently or only terminally, such as poly-acrylates, polyalkyl alkylacrylates, polyesters, or weakly acidic hydroxyl groups (—OH), such as carbinol (—C—OH) groups in alcohols and polyols, polyesters, more particularly those with measurable amounts of free carboxylic acid groups (—COOH) groups, for example, those polymers as used for the preparation of 1-component and 2-component polyurethanes for surface coatings, adhesives, sealants, and glass-fiber-reinforced plastics, more particularly those having an acid number in accordance with DIN 53402 or ISO 3682 of greater than 1 ml/g, more preferably greater than 5 ml/g, yet more preferably greater than 10 ml/g, still more preferably greater than 20 ml/g, and most preferably greater than 50 ml/g.

In accordance with the invention, suspensions preferably contain greater than 1 percent by weight of carboxyl-containing polymer having an acid number greater than 1 ml/g and greater than 5 percent by weight, more preferably greater than 10 percent by weight, yet more preferably greater than 15 percent by weight, and with very particular preference greater than 18 percent by weight of a particulate thickener surface-functionalized with aminoalkylsiloxy groups, such as metal oxides, more preferably silica, with particular preference fumed silica, prepared for example in accordance with EP-A-1304332, with a BET specific surface area of greater than 150 m$^2$/g. With particular preference the suspension of the invention contains 25 percent by weight and with very particular preference greater than 35 percent by weight of a fumed silica having a BET specific surface area of less than 150 m$^2$/g.

Preferred are suspensions which comprise at least one polymer that contains silanol groups and siloxane groups and that comprises particulate thickener that contains silanol groups, siloxane groups, and alkylsiloxy groups, it being possible for the respective group to be present alone or in any desired mixtures with one another, which chemisorptively bind the polymer.

Preferred examples of suspensions of the invention are polysiloxanes, more preferably polyalkylsiloxanes, and with particular preference polydimethylsiloxanes, that contain particulate thickener, preferably fumed silica grafted with polysiloxane, preferably polyalkylsiloxane, more preferably polydimethylsiloxane. Preferably this takes place by polycondensation or addition-polymerization of polydimethylsiloxane onto fumed SILICA; this may take place by basic catalysis, for example, with amines or ammonia, but may also take place, for example, by thermally driven reaction, in which case temperatures of greater than 150° C., preferably greater than 200° C., at reaction times of greater than 5 hours are necessary, or preferably at temperatures of greater than 250° C., with particular preference greater than 300° C., with reaction times of less than 1 hour. A minimum reaction time of less than 15 minutes should not be undershot, and a maximum temperature of greater than 400° C., preferably not greater than 350° C., should not be exceeded. Another preferred chemical reaction may be obtained oxidatively at temperatures greater than 100° C. and oxygen content of greater than 1 percent by volume; one preferred variant which is favorable for process reasons is the mechanochemically induced reaction at temperatures greater than −40° C. and average shear rates of greater than 1000 s$^{-1}$ and local shear rates of greater than 10,000 s$^{-1}$. This can take place by suspending and dispersing the silica with high-shearing assemblies which, globally and locally, introduce very high shearing energies into the suspension, such as mixing turbines, high-speed compounders or rolls such as 2-roll mills, preferably with friction greater than 1.01, or 3-roll mills. The suspensions of the invention that are obtained in this way exhibit a fluidity and a soft mass, with a degree of filling of the suspension of up to 50 percent by weight of particulate thickener.

The particulate thickener, preferably fumed silica, preferably has a polydimethylsiloxane content of greater than 10, more preferably greater than 25, yet more preferably greater than 33, and most preferably greater than 50 percent by weight, measured via a carbon content of greater than 3.3, preferably greater than 8, more preferably greater than 11, and with particular preference, greater than 50 percent by weight. This may be determined preferably, for the purposes of analysis, by extraction/dissolution and sedimentation with decanting or dissolving and separating centrifugation, and subsequent measurement of the isolated particulate thickener, preferably fumed silica, for carbon content, by means of elemental analysis, for example.

Preferably coating materials, adhesives, and sealants are prepared comprising a suspension of the invention. It is further preferable to prepare synthetic or natural, unvulcanized or vulcanized rubber, comprising a suspension of the invention.

Suspensions of the invention are preferably used for preparing coating materials, more preferably for scratch-resistant coating materials and those coating materials having improved surface mechanics, for preparing adhesives and sealants, preferably for high-strength and high-impact adhesives and sealants.

Surprisingly it is possible in this way to use particulate thickeners, available industrially in high volume and which can be prepared inexpensively, such as precipitated silica and fumed silica, fumed aluminum oxides and titanium dioxides, as reinforcing fillers with a high degree of filling and hence with high reinforcing effect and simultaneously low viscosity, and hence cost-effective handling and good and simple processing of the suspensions of the invention.

Suspensions of the invention are preferably used for the preparation of coating materials, adhesives, and sealants, with high loading of particulate thickener in conjunction with low viscosity and hence excellent processing properties.

The suspensions of the invention are preferably used for the preparation of peroxidically crosslinked or addition-crosslinked silicone rubbers of high degree of filling with fumed silica and high strength, high modulus, high notched strength, and high elasticity of the crosslinked compositions, and at the same time excellent processing properties such as fluidity of the uncrosslinked compositions.

The suspensions of the invention are also preferably used for the preparation of high-strength and/or elastic coatings, epoxide-based adhesives and sealants, with high strength, high modulus, high fracture energy, and high impact strength, using epoxides as binders and using Jeffamines, polymeric amines, aliphatic amines, and aromatic amines as curing agents.

The suspensions of the invention are also preferably used for the production of high-hardness and/or elastic surface coatings from 2-component polyurethanes, using polyols as binders and isocyanates as curing agents, to give surface coatings having high gloss, low surface abrasion, and high transparency in conjunction with excellent scratch resistance with losses of gloss of less than 50% and high chemical resistance. and high impact strength, using epoxides as binders and using Jeffamines, polymeric amines, aliphatic amines, and aromatic amines as curing agents.

The suspensions of the invention can be used with preference for the production of high-hardness and/or elastic surface coatings from 2-component POLYURETHANES, using polyols as binders and isocyanates as curing agents, to give surface coatings having high gloss, low surface abrasion, and high transparency in conjunction with excellent scratch resistance with losses of gloss of less than 50% and high chemical resistance.

EXAMPLE 1

Preparation of a transparent 2-component polyurethane topcoat with 9.5 percent by weight of fumed silica based on solids: 92.5 g added of a hydroxyl-containing acrylate resin having an acid number of 9-12 mg/g, an OH number of 4.2% (based on the solids of the binder), a glass transition temperature $T_g=34°$ C., and an average molecular weight of 1900 g/mol are adjusted with solvent to a solids of 52.5 percent by weight, by addition of 47.5 percent by weight of a solvent mixture of aromatic hydrocarbons, glycol ether ester, butyl acetate, and with a viscosity at $T=25°$ C. of 450 mPas. Subsequently 7.5 g of hydrophilic fumed silica having a BET specific surface area of 50 $m^2/g$, obtainable from Wacker-Chemie GmbH, Germany, under the name HDK® D05, are added in portions with stirring with a dissolver. Subsequently this batch is dispersed via a bead mill to a grindometer value at the resolution limit of the grindometer test of about 0 to 5 μm. The fumed silica content is 13.4 percent by weight, based on the solids. 100 parts of this batch are subsequently mixed with 6.8 parts of the above-described hydroxyl-containing acrylate resin and with 2 parts of 98-percent butyl acetate and 0.6 parts of 1-percent strength dibutyltin dilaurate solution in 98-percent butyl acetate, and then this overall batch, in this case the binder component, is mixed with a polyisocyanate of the HDI trimer type (trimer of hexamethylene diisocyanate) as curing agent, with a molecular weight of 505 g/mol, an isocyanate (NCO) content of 22 percent by weight based on solids, a solids of 100 percent by weight, and a viscosity at $T=25°$ C. of 2000 mPas, in a binder to curing agent mixing ratio of 100 to 23. This final mixture of binder and curing agent has the following characteristics: stoichiometric reaction of —OH and —NCO is 1 to 1, formulation solids is 64 percent by weight, and fumed silica is 9.5 percent by weight based on solids.

A very readily fluid system having a very low absolute viscosity, low relative viscosity, low structural viscosity, little thixotropy, near Newtonian flow behavior and hence outstanding paint body as a basis for good formulation properties and hence processing properties as a topcoat is thereby obtained.

The rheological data of the formulation, measured with a UDS 200 cone/plate rheometer from Physica, Germany, are given in tables 1 and 2.

EXAMPLE 2

The procedure of example 1 is repeated, but with hydrophilic fumed silica having a BET specific surface area of 50 $m^2/g$, available from Wacker-Chemie GmbH, Germany, under the name HDK® D05, replaced by hydrophilic fumed silica having a BET specific surface area of 125 $m^2/g$, available from Wacker-Chemie GmbH, Germany, under the name HDK® S13.

Obtained is a very readily fluid system having a very low absolute viscosity, low relative viscosity, low structural viscosity, little thixotropy, near Newtonian flow behavior and hence outstanding paint body as a basis for good formulation properties and hence processing properties as a topcoat.

The rheological data of the formulation, measured with a UDS 200 cone/plate rheometer from Physica, are given in tables 1 and 2.

EXAMPLE 3

The procedure of example 1 is repeated, but with hydrophilic fumed silica having a BET specific surface area of 50 $m^2/g$, available from Wacker-Chemie GmbH, under the name HDK® D05, replaced by hydrophilic fumed silica having a BET specific surface area of 150 $m^2/g$, available from Wacker-Chemie GmbH, under the name HDK® V15.

Obtained is a very readily fluid system having a very low absolute viscosity, low relative viscosity, low structural viscosity, little thixotropy, near Newtonian flow behavior and hence outstanding paint body as a basis for good formulation properties and hence processing properties as a topcoat.

The rheological data of the formulation, measured with a UDS 200 cone/plate rheometer from Physica, are given in tables 1 and 2.

The procedure of example 1 is repeated, but with hydrophilic fumed silica having a BET specific surface area of 50 $m^2/g$, available from Wacker-Chemie GmbH, under the name HDK® D05, replaced by hydrophilic fumed silica having a BET specific surface area of 200 $m^2/g$, available from Wacker-Chemie GmbH, under the name HDK® N20.

EXAMPLE 4

Obtained is a very readily fluid system having a very low absolute viscosity, low relative viscosity, low structural viscosity, little thixotropy, near Newtonian flow behavior and hence outstanding paint body as a basis for good formulation properties and hence processing properties as a topcoat.

The rheological data of the formulation, measured with a UDS 200 cone/plate rheometer from Physica, are given in tables 1 and 2.

EXAMPLE 5

The procedure of example 1 is repeated, but with hydrophilic fumed silica having a BET specific surface area of 50 $m^2/g$, available from Wacker-Chemie GmbH, under the name HDK® D05, replaced by hydrophilic fumed silica having a BET specific surface area of 300 $m^2/g$, available from Wacker-Chemie GmbH, under the name HDK® T30.

What is obtained is a very readily fluid system having a very low absolute viscosity, low relative viscosity, low structural viscosity, little thixotropy, near Newtonian flow behavior and hence outstanding paint body as a basis for good formulation properties and hence processing properties as a topcoat.

The rheological data of the formulation, measured with a UDS 200 cone/plate rheometer from Physica, are given in tables 1 and 2.

TABLE 1 examples 1 to 5 absolute viscosity [mPas].

| D [1/s] | No HDK Visc. [mPas] | D05 Visc. [mPas] | S13 Visc. [mPas] | V15 Visc. [mPas] | N20 Visc. [mPas] | T30 Visc. [mPas] |
|---|---|---|---|---|---|---|
| 0.1 | 770 | 835 | 1290 | 1110 | 1670 | 1470 |
| 1 | 750 | 860 | 1040 | 980 | 1310 | 1260 |
| 10 | 750 | 860 | 1020 | 950 | 1610 | 1170 |
| 100 | 750 | 895 | 1111 | 1040 | 2220 | 1370 |
| 500 | 720 | 850 | 1030 | 980 | 1760 | 1210 |

Visc.: absolute viscosity at 25° C.
D: shear rate in [1/s]
No HDK: without fumed silica

TABLE 2 examples 1 to 5 relative viscosity $\eta_{rel} = \eta/\eta_0$.

| D [1/s] | D05 rel. visc. | S13 rel. visc. | V15 rel. visc. | N20 rel. visc. | T30 rel. visc. |
|---|---|---|---|---|---|
| 0.1 | 1.1 | 1.7 | 1.4 | 2.2 | 1.9 |
| 1 | 1.1 | 1.4 | 1.3 | 1.7 | 1.7 |
| 10 | 1.1 | 1.4 | 1.3 | 2.1 | 1.6 |
| 100 | 1.2 | 1.5 | 1.4 | 3.0 | 1.8 |
| 500 | 1.2 | 1.4 | 1.4 | 2.4 | 1.7 |

Rel. visc.: relative viscosity at 25° C.
D: shear rate in [1/s]

EXAMPLE 6

From the respective batches according to examples 1 to 5, using a knife coater, drawdowns with dry film thicknesses of 40 μm on glass are prepared, with subsequent drying on storage for 30 minutes at room temperature, and subsequent storage and curing for 30 minutes at a temperature of 130° C. in a forced-air oven. After a further 24 hours of storage at room temperature, these paint films thus produced are measured in accordance with ASTM D1003 in transmission for transparency, haze, and clarity. Apart from with example 1, HDK® D05, highly transparent clearcoats are obtained. HDK D05 has primary particles of greater than 50 nm, and hence only low transparency can be expected even on homogeneous colloidal dispersion. The high clarity of the paint body indicates the good and homogeneous colloidal dispersion of the fumed silica. An outstanding glossy paint surface is measured, confirming the excellent low-viscosity properties and flow properties of the clearcoat. The high level of smoothness of the paint films demonstrates the very good processing properties of the topcoat on the basis of its low viscosity, as described in examples 1 to 5.

TABLE 3

ASTM D1003 measurement in transmission for transparency, haze, and clarity

| | | No HDK | D05 | S13 | V15 | T30 |
|---|---|---|---|---|---|---|
| Transp. | % | 93.3 | 93.0 | 93.1 | 93.4 | 93.5 |
| Haze | % | 0.20 | 0.60 | 0.17 | 0.28 | 0.39 |
| Clarity | % | 100 | 99.80 | 99.70 | 100 | 100 |

Transp.: transparency
No HDK: without fumed silica

EXAMPLE 7

Preparation of a transparent 2-component polyurethane topcoat with 15 percent by weight of fumed silica on solids: 61.1 g of a hydroxyl-containing acrylate resin having an acid number of 9-12 mg/g, an OH number of 4.2% (based on binder solids), a glass transition temperature Tg=34° C., and a molecular weight of 1900 g/mol are adjusted to a solids of 52.5 percent by weight, by addition of 47.5 percent by weight of a solvent consisting of aromatic hydrocarbons, glycol ether ester and butyl acetate, and with a viscosity at T=25° C. of 450 mPas. This batch is introduced in a batching container together with 24.8 g of a solvent mixture of Solvesso 100 to 98 percent butyl acetate of 70:30. To this batch, 10.9 g fumed silica having a BET specific surface area of 300 $m^2/g$, obtainable from Wacker-Chemie GmbH, under the name HDK® T30, are added in portions with stirring with a dissolver.

Subsequently this batch is dispersed via a bead mill to a grindometer value at the resolution limit of the test of 0 to 5 μm. This overall batch thus prepared is subsequently admixed with 0.5 g of piperidinyl sebacate (a mixture of 75 percent by weight bis-1,2,2,6,6-pentamethyl-4-piperidinyl sebacate and 25 percent by weight methyl-1,2,2,6,6-pentamethyl-4-piperidinyl sebacate), obtainable from Ciba Specialty Chemicals, CH, under the trade name Tinuvin® 292 (a liquid universal light stabilizer (HALS: hindered-amine light stabilizer)), and also 1.0 g of a 1-percent strength dibutyltin dilaurate solution in 98-percent butyl acetate, and also 0.7 g of a nonionic surfactant based on polyethylene oxide-modified polydimethylsiloxane having a density of 1.04 kg/l, obtainable under the trade name BYK® 331 available from Byk-Chemie, Germany, as a 10-percent strength solution in 98-percent butyl acetate, and also 10.1 g of the above-described hydroxyl-containing acrylate resin, and made up with 3.0 g of a solvent mixture of Solvesso 100 to 98-percent butyl acetate of 70:30. This overall batch is mixed in a mixing ratio of 100 to 18.5 with a polyisocyanate of the HDI trimer type, having a molecular weight of 505 g/mol, an NCO content of 22% based on solids, a solids of 100 percent by weight, and a viscosity at T=25° C. of 2000 mPas. The overall system is characterized by the following parameters stoichiometric reaction of —OH to —NCO is 1 to 1, formulation solids is 54 percent by weight, and fumed silica HDK® T30 is 15 percent by weight in the solids.

Obtained is an excellently fluid system with a very low absolute viscosity, low relative viscosity, very low structural viscosity, very low thixotropy, near Newtonian flow behavior and hence outstanding paint body as a basis for good formulating properties and hence processing properties as a topcoat.

The rheological data for example 7, measured with a UDS 200 cone/plate rheometer from Physica, are given in table 3.

TABLE 3 example 7 absolute viscosity [mPas].

| D [1/s] | Visc. [mPas] |
|---|---|
| 1 | 63 |
| 10 | 72 |
| 100 | 66 |
| 500 | 68 |

Visc.: absolute viscosity at 25° C.
D: shear rate in [1/s]

EXAMPLE 8

From the batch from example 7, drawdowns are drawn down onto glass, using the knife coater, at dry film thicknesses of 35 μm, and after storage and drying for 30 minutes at room temperature are stored and cured for 30 minutes at a temperature of 130° C. in a forced-air oven. After subsequent further storage for 24 hours at room temperature, these films are measured in accordance with ASTM D1003 in transmission. The high clarity of the paint body shows the good and homogeneous colloidal dispersion of the fumed silica. An outstanding glossy paint surface is measured, confirming the excellent low-viscosity properties and flow properties of the clearcoat.

TABLE 4 measurement of example 8 according to ASTM D1003 in transmission

| | | No HDK | T30 |
|---|---|---|---|
| Transp. | % | 93.2 | 93.2 |
| Haze | % | 0.3 | 0.2 |
| Clarity | % | 100 | 100 |

Transp.: transparency
No HDK: without fumed silica

EXAMPLE 9

The scratch resistance of the surface of the cured paint film according to example 8 is determined using a Peter-Dahn abrasion tester. For this purpose a Scotch Brite® 2297/3M Scotch-Brite CF-HP S-SFN (soft) abrasive nonwoven pad with an area of 45×45 mm is loaded with a weight of 1000 g. Using this weighted pad, the paint samples are scratched with a total of 40 strokes. Both before the beginning and after the end of the scratch tests, the gloss of the coating is measured using a Microgloss 20° gloss meter from Byk. The measure determined for the scratch resistance of the coating is the loss of gloss in comparison to the initial value.

TABLE 5 loss of gloss of example 8

| Loss of gloss % | | No HDK | T30 |
|---|---|---|---|
| after 10 cycles | % | 38 | 32 |
| after 20 cycles | % | 64 | 51 |
| after 30 cycles | % | 68 | 62 |

EXAMPLE 10

Preparation of a transparent 2-component polyurethane topcoat with 15 percent by weight of fumed silica on solids: 62.1 g of a hydroxyl-containing acrylate resin having an acid number of 9-12 mg/g, an OH number of 4.2% on binder solids, a glass transition temperature Tg=34° C., and a molecular weight of 1900 g/mol adjusted to a solids of 52.5 percent by weight, by addition of 47.5 percent by weight of a solvent containing aromatic hydrocarbons, glycol ether ester, butyl acetate, and with a viscosity at T=25° C. of 450 mPas are introduced in a batching container together with 24.8 g of a solvent mixture of Solvesso100 to 98 percent butyl acetate of 70:30. To this batch, 10.9 g of aminoalkyl-modified fumed silica obtainable from Wacker-Chemie GmbH, D, under the trade name HDK® H30RA, which has an aminopropyldimethylsiloxy group content of 0.09 mol/g and can be prepared, for example, in accordance with EP-A-1304332, and has a carbon content of 5 percent by weight and a nitrogen content of 1 percent by weight, both determined by elemental analysis (based on a hydrophilic fumed silica having a specific surface area of 300 m$^2$/g, HDK, obtainable from Wacker-Chemie GmbH, under the trade name HDK® T30) are added in portions with stirring with a dissolver. Subsequently this batch is dispersed via a bead mill to a grindometer value at the resolution limit of the grindometer test of 0 to 5 μm. This overall batch was subsequently admixed with 0.5 g of piperidinyl sebacate (a mixture of 75 percent by weight bis-1,2,2,6,6-pentamethyl-4-piperidinyl sebacate and 25 percent by weight methyl-1,2,2,6,6-pentamethyl-4-piperidinyl sebacate), obtainable from Ciba Specialty Chemicals, CH, under the trade name Tinuvin® 292 (a liquid universal light stabilizer (HALS: hindered-amine light stabilizer)), and also 1.0 g of a 1-percent strength dibutyltin dilaurate solution in 98-percent butyl acetate, and also 0.7 g of a nonionic surfactant based on polyethylene oxide-modified polydimethylsiloxane having a density of 1.04 kg/l, obtainable under the trade name BYK® 331 available from Byk-Chemie, as a 10-percent strength solution in 98-percent butyl acetate, and also 10.1 g of the above-described hydroxyl-containing acrylate resin, and made up with 3.0 g of a solvent mixture of Solvesso 100 to 98-percent butyl acetate of 70:30. This overall batch of the binder component is mixed in a mixing ratio of 100 to 18.5 with a polyisocyanate of the HDI trimer type as curing agent, having a molecular weight of 505 g/mol, an NCO content of 22% based on solids, a solids of 100 percent by weight, and a viscosity of 2000 mPas. The overall system is characterized by the following parameters: stoichiometric reaction of —OH to —NCO is 1 to 1, formulation solids is 54 percent by weight, and fumed silica HDK® is 15 percent by weight in the solids.

Obtained is an excellently fluid system with a very low absolute viscosity, low relative viscosity, very low structural viscosity, little thixotropy, near Newtonian flow behavior and hence outstanding paint body as a basis for good formulating properties and hence processing properties as a topcoat.

The rheological data for example 10, measured with a UDS 200 cone/plate rheometer from Physica, are given in table 5.

TABLE 5

| example 10 absolute viscosity [mPas]. | |
|---|---|
| D [1/s] | Visc. [mPas] |
| 1 | 168 |
| 10 | 166 |
| 100 | 153 |
| 500 | 149 |

Visc.: absolute viscosity at 25° C.
D: shear rate in [1/s]

The measurements were made with a cone/plate rheometer

EXAMPLE 11

From this batch, drawdowns are prepared on glass, using a knife coater, at dry film thicknesses of 35 μm, and then stored for 30 minutes at room temperature and then stored for a further 30 minutes at a temperature of 130° C. in a forced-air oven. After further storage of the films for 24 hours at room temperature, measurement is carried out in accordance with ASTM D1003 in transmission. The high clarity of the paint body shows the good and homogeneous colloidal dispersion of the fumed silica. An outstanding glossy paint surface is measured, confirming the excellent low-viscosity properties and flow properties of the clearcoat.

TABLE 6

| measurement of example 11 according to ASTM D1003 in transmission | | | |
|---|---|---|---|
| | | No HDK | HDK H30RA |
| Transp. | % | 93.2 | 93.5 |
| Haze | % | 0.3 | 0.5 |
| Clarity | % | 100 | 99 |

Transp.: transparency
No HDK: without fumed silica

EXAMPLE 12

The scratch resistance of the surface of the cured paint film according to example 11 is determined using a Peter-Dahn abrasion tester. For this purpose a Scotch Brite® 2297/3M Scotch-Brite CF-HP S-SFN (soft) abrasive nonwoven pad with an area of 45×45 mm is loaded with a weight of 1000 g. Using this weighted pad, the paint samples are scratched with a total of 40 strokes. Both before the beginning and after the end of the scratch tests, the gloss of the coating is measured using a Microgloss 20° gloss meter from Byk. The measure determined for the scratch resistance of the coating is the loss of gloss in comparison to the initial value.

TABLE 7

| loss of gloss of example 11 | | | |
|---|---|---|---|
| Loss of gloss relative to the unexposed sample | | No HDK 30-35 μm dft | HDK H30RA 30-35 μm dft |
| after 10 cycles | % | 38 | 24 |
| after 20 cycles | % | 64 | 37 |
| after 30 cycles | % | 78 | 44 |
| after 40 cycles | % | 85 | 48 |

EXAMPLE 13

To 475 g of a Liquid Diglycidyl Ether of Bisphenol a (DGEBA)

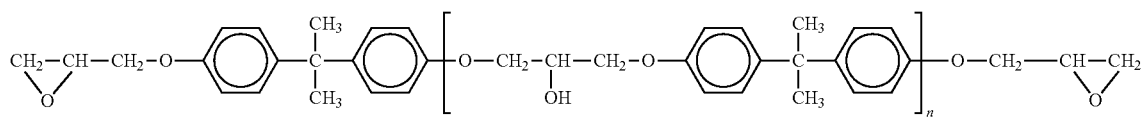

available from Dow Chemicals under the name Dow DER 330, or from Shell under the name Epikote 828, with a polymerization index of n=0.15 and a molar weight of Mn=340+284.n=382.6 g/mol, which for liquefication is preheated for 2 hours at a temperature of 50° C., there are added and incorporated 25 g of aminoalkyl-modified fumed silica, obtainable under the trade name HDK® H30RA from Wacker-Chemie GmbH, D, which has an aminopropyldimethylsiloxy group content of 0.09 mol/g and can be prepared, for example, in accordance with EP-A-1304332, and has a carbon content of 5 percent by weight and a nitrogen content of 1 percent by weight, both determined by elemental analysis (based on a hydrophilic fumed silica having a specific surface area of 300 m²/g HDK, obtainable from Wacker-Chemie GmbH, under the trade name HDK® T30), and this mixture is dispersed using a Rayneri Turbotest 33/300P dissolver. The silica is metered gradually into the liquid phase, and dispersed first with a rotational speed of the mixer of 500 revolutions per minute, followed for a few minutes at a higher rotational speed of 3300 per minute, i.e., approximately a peripheral disk speed of 11 m/s, before further silica is added. When all of the silica has been incorporated and dispersed, the batch is dispersed at a rotational speed of 3300 per minute for 1 hour. The dispersing of the fumed silica may cause heating of the composition to 60 to 80° C. The quality of dispersing is monitored with a grindometer to a value close to 0 μm by optical microscopy and by viscosity measurements. Finally, then, the mixture is degassed in a vacuum reactor for 30 minutes and for one hour at a temperature of 80° C., with slow stirring.

EXAMPLE 14

The procedure of example 13 is repeated but replacing 475 g of DGEBA Dow DER330 by 450 g of DGEBA Dow DER330, and replacing 25 g of fumed silica HDK® H30RA by 50 g of fumed silica HDK® H30RA.

EXAMPLE 15

The procedure of example 13 is repeated but replacing 475 g of DGEBA Dow DER330 by 425 g of DGEBA Dow DER330, and replacing 25 g of fumed silica HDK® H30RA by 75 g of fumed silica HDK® H30RA.

TABLE 8 mixing ratios of the suspensions according to examples 13, 14 and 15: silica HDK ® H30RA suspensions in epoxy DGEBA DER330

| % by weight HDK ® H30RA | Mass of HDK ® H30RA [g] | Mass of DGEBA | Appearance of the composition at 50° C. |
| --- | --- | --- | --- |
| 5 | 25 | 475 | Example 13 fluid |
| 10 | 50 | 450 | Example 13 fluid |
| 15 | 75 | 425 | Example 13 fluid |

The reaction of an epoxy unit with functionality e=1 and of a primary amine with functionality a=2 leads to the formation of a chemisorptive and chemical attachment of the epoxy resin DGEBA and the aminoalkyl-functional silica HDK® H30RA. The functional stoichiometric ratio is defined by the amino hydrogen atom-to-epoxy function ratio r=a/e The silica contained in the suspension is separated by dissolving 2.5 g of the epoxy resin-and-silica suspension according to examples 13, 14 and 15 in 50 ml of tetrahydrofuran and then centrifuging in a laboratory centrifuge at 5000 revolutions per minute, and the sediment is washed and purified by being taken up five times into tetrahydrofuran and centrifuged to remove free, unbound epoxy resin, and separated from the unbound epoxy resin, dried, and analyzed. This silica isolated in this way from the suspension has a carbon content of 41 percent by weight and also a loss of mass in thermogravimetry to 550° C. under air of 42 percent by weight. This corresponds to an average reaction of 1.7 mol of amino hydrogen groups of the silica HDK' H30RA with one mole of the epoxy groups of the epoxy resin. $^1$H-NMR, $^{13}$C-NMR, and infrared spectroscopy demonstrate the surface reaction of the aminoalkyl-functional silica HDK® H30RA with the epoxy resin DGEBA. For examples 13, 14 and 15, this elemental analysis produces ratios of r=a/e=of approximately 0.85, which demonstrates the chemisorptive binding, taking place under in situ conditions of the mixture, of the epoxy resin DGEBA to the aminoalkyl-functional silica HDK® H30RA.

The reaction of an epoxy unit with functionality e=1 and of a primary amine with functionality a=2 leads to the formation of a chemisorptive and chemical attachment of the epoxy resin DGEBA and the aminoalkyl-functional silica HDK® H30RA. The functional stoichiometric ratio is defined by the amino hydrogen atom-to-epoxy function ratio r=a/e

EXAMPLE 16

To 450 g of a liquid bis(2-aminopropyl)polypropylene glycol

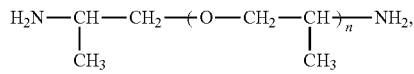

available under the name Jeffamine D2000®, from Huntsman, with the formula and chain length n-33.1, molar weight Mn=2000 g/mol, are added and incorporated 50 g of a hydrophilic fumed silica, available from Wacker-Chemie GmbH under the trade name HDK® T30, and this mixture is dispersed using a Rayneri Turbotest 33/300P dissolver, or with a Dispermat having a toothed disk 65 mm in diameter. The silica is metered gradually into the liquid phase, and dispersed first with a rotational speed of the mixer of 500 revolutions per minute, followed for a few minutes at a higher rotational speed of 3300 per minute, i.e., approximately a peripheral disk speed of 11 m/s, before further silica is added. When all of the silica has been incorporated and dispersed, the batch is dispersed at a rotational speed of 3300 per minute for 1 hour. The dispersing of the fumed silica may cause heating of the composition to 60 to 80° C. The quality of dispersing is monitored with a grindometer to a value close to 0 μm, by optical microscopy and by viscosity measurements. Finally, then, the mixture is degassed in a vacuum reactor, for 30 minutes and for one hour at a temperature of 80° C., with slow stirring.

EXAMPLE 17

The procedure of example 16 is repeated but replacing 450 g of Jeffamine D2000 by 400 g of Jeffamine D2000® and replacing 50 g of fumed silica HDK® T30 by 100 g of fumed silica HDK® T30.

TABLE 9 mixing ratios of the dispersions: silica HDK ® T30 in Jeffamine D2000 ®

| % by weight HDK ® T30 | Mass of HDK ® T30 [g] | Mass of Jeffamine D2000 ® [g] | |
| --- | --- | --- | --- |
| 10 | 50 | 450 | example 16 |
| 20 | 100 | 400 | example 17 |

The silica contained in the suspension is separated off by dissolving 2.5 g of the epoxy resin-and-silica suspension according to examples 16 and 17 in 50 ml of tetrahydrofuran and then centrifuging in a laboratory centrifuge at 5000 revolutions per minute, and the sediment is washed and purified by being taken up five times into tetrahydrofuran and centrifuged to remove free, unbound epoxy resin, and separated from the unbound epoxy resin, dried, and analyzed. For examples 16 and 17, the elemental analysis gives a carbon content, for the Jeffamin bound physisorptively to hydrophilic silica HDK® T30, of more than 20 percent by weight.

EXAMPLE 18

The composition from examples 13, 14, and 15 are crosslinked with a solid amino curing agent, 4,4'-methylene-bis[2,6-d]methylamiline], MDEA, molecular weight $m_n$=310 g/mol,

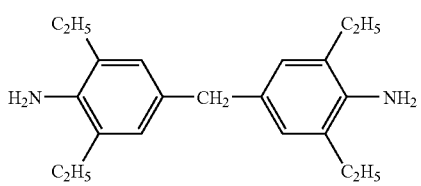

15 obtainable for example from Lonza. For this purpose, MDEA is heated at 90° C., thereby liquefying it, and is mixed into the compositions from examples 13, 14, and 15, and the mixture is introduced into a mold. The proportion of DGEBA to MDEA in this case is 71.17 to 28.83. The crosslinking is implemented in a programmable oven: 4 hours at 135° C., followed by post-crosslinking for 4 hours at 190° C.

The crosslinked compositions with fumed silica HDK® H30RA exhibit a significantly increased strength, including impact strength, as compared with compositions without fumed silica.

EXAMPLE 19

The composition from examples 16 and 17 are crosslinked with DGEBA Dow DER330. For this purpose, DGEBA is heated at 50° C., thereby liquefying it, and is mixed into the compositions from examples 16 and 17, and the mixture is introduced into a mold. The proportion of DGEBA DOW DER330 to Jeffamine D2000® in this case is 27.67 to 72.33. The crosslinking is implemented in a programmable oven: 4 hours at 120° C., followed by post-crosslinking for 4 hours at 150° C.

The crosslinked compositions with fumed silica HDK® T30 exhibit a significantly increased strength, and elasticity as compared with compositions without fumed silica.

EXAMPLE 20

1 kg of an aminoalkyl-modified fumed silica, obtainable under the trade name HDK® H30RA from Wacker-Chemie GmbH which has an aminopropyldimethylsiloxy group content of 0.09 mol/g and can be prepared, for example, according to EP-A-1304332, and has a carbon content of 5 percent by weight and a nitrogen content of 1 percent by weight, both determined by elemental analysis (based on a hydrophilic fumed silica having a specific surface area of 300 m²/g HDK, obtainable from Wacker-Chemie GmbH under the trade name HDK® T30) is incorporated over 45 minutes to 9 kg of liquid epoxy resin bisphenol A diglycidyl ether (DGEBA: diglycidyl ether of bisphenol A), obtainable, for example, from Dow Chemicals under the trade name Dow DER® 330, or from Shell under the name Epikote® 828, having a polymerization index of n=0.15 and a molar weight of Mn=340+284.n=382.6 g/mol, with a planetary dissolver; the temperature is limited to 60° C. during this procedure; the result is a composition having a relative viscosity of 3.2.

The silica contained in the suspension is separated by dissolving 2.5 g of the epoxy resin-and-silica suspension in 50 ml of tetrahydrofuran and then centrifuging in a laboratory centrifuge at 5000 revolutions per minute, and the sediment is washed and purified by being taken up five times in tetrahydrofuran and centrifuged to remove free, unbound epoxy resin, and is separated off from the unbound epoxy resin, dried, and analyzed. This silica isolated from the suspension in this way has a carbon content of 41 percent by weight, and also a loss of mass in thermogravimetry to 550° C. under air of 42 percent by weight. This corresponds to an average reaction of 1.7 mol of amino hydrogen groups of the silica HDK® H30RA with one mole of the epoxy groups of the epoxy resin.

The invention claimed is:

1. A suspension comprising at least 3 percent by weight of at least one particulate fumed silica, the fumed silica having bound thereto at least 5 weight percent, based on the weight of the fumed silica, of at least one organic polymer;
a liquid phase comprising up to 80 weight percent, based on the weight of the liquid phase, of solvent, low molecular weight crosslinkable component, or mixture thereof, the liquid phase having a viscosity less than 100 mPa·s at 25° C., and from 10-100 weight percent, based on the weight of the liquid phase, of a polymer component which optionally comprises two or more physically or chemically crosslinkable polymers;
wherein a relative viscosity of the suspension $\eta/\eta_0$ is less than 100, wherein $\eta$ and $\eta_0$ are measured at 25° C. and wherein upon storage at 40° C. for one week, the relative viscosity $\eta/\eta_0$ changes by a factor of less than 10.

2. The suspension of claim 1, wherein the average primary particle size of the fumed silica is from 0.5 nm to 1000 nm.

3. The suspension of claim 2, wherein the average primary particle size is from 5 nm to 100 nm.

4. The suspension of claim 2, wherein an epoxy resin is present in the liquid phase as the polymer component.

5. The suspension of claim 1, wherein the organic polymer is bound physisorptively to the particulate fumed silica.

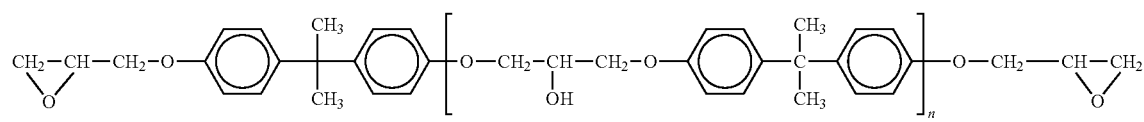

6. The suspension of claim 1, wherein the organic polymer is bound chemisorptively to particulate fumed silica.

7. The suspension of claim 6, wherein the particulate fumed silica bears, by partial or complete surface modification, surface groups which react chemically with the organic polymer.

8. The suspension of claim 7, wherein the partial or complete surface modification of the particulate fumed silica with surface groups comprises a silylation with organofunctional siloxy groups.

9. The suspension of claim 7, wherein the organic polymer is chemisorptively bound to the surface modified fumed silica, the surface modified fumed silica, prior to chemisorptive bonding, bearing at least one reactive group selected from the group consisting of organofunctional epoxy, amino, mercapto, acrylate, isocyanate, carbinol and carboxylic anhydride groups, which react chemically with the organic polymer.

10. The suspension of claim 8, wherein the organic polymer is chemisorptively bound to the particulate fumed silica, the surface modified fumed silica prior to chemisorptive bonding, bearing at least one reactive group selected from the group consisting of organofunctional epoxy, amino, mercapto, acrylate, isocyanate, carbinol and carboxylic anhydride groups, which react chemically with the organic polymer.

11. The suspension of claim 1, wherein the organic polymer contains epoxy groups, and the particulate fumed silica bears amino groups, mercapto groups, carboxylic anhydride groups, carbinol groups, or a combination thereof which bind chemisorptively to the organic polymer.

12. The suspension of claim 1, wherein the organic polymer contains isocyanate groups, and the particulate fumed silica contains silanol, amino, carbinol groups, or a combination thereof which bind chemisorptively to the organic polymer.

13. The suspension of claim 1, wherein the organic polymer contains amino groups, and the particulate fumed silica contains silanol, carbinol, carboxylic acid groups, or a combination thereof which bind physisorptively to the organic polymer.

14. The suspension of claim 1, wherein the organic polymer contains carboxylic acid groups, and the particulate fumed silica contains amino groups which bind physisorptively to the organic polymer.

15. The suspension of claim 1, wherein the organic polymer contains carbinol or isocyanate groups, and the particulate fumed silica contains silanol groups, siloxane groups, or a combination thereof, which bind physisorptively to the organic polymer.

16. The suspension of claim 1, wherein the organic polymer contains silanol groups, siloxane groups, or a combination thereof, and the particulate fumed silica contains silanol groups, siloxane groups, alkylsiloxy groups, or a combination thereof, which bind chemisorptively to the organic polymer.

17. A coating material, adhesive or sealant comprising a suspension of claim 1.

18. A synthetic or natural unvulcanized or vulcanized rubber comprising at least one suspension of claim 1.

19. The suspension of claim 1, wherein the particulate fumed silica contains chemically bound organic polymer in an amount of from 10 parts organic polymer to 100 parts organic polymer per 100 parts particulate fumed silica.

20. The suspension of claim 19, wherein the chemically bound organic polymer comprises an epoxy resin.

* * * * *